(12) United States Patent
Sugiyama

(10) Patent No.: US 9,224,138 B2
(45) Date of Patent: Dec. 29, 2015

(54) POS CONTROL SYSTEM, CONTROL METHOD OF A POS CONTROL SYSTEM, AND PRINTING DEVICE

(71) Applicant: Seiko Epson Corporation, Tokyo (JP)

(72) Inventor: Yuichi Sugiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/591,490

(22) Filed: Jan. 7, 2015

(65) Prior Publication Data

US 2015/0193762 A1 Jul. 9, 2015

(30) Foreign Application Priority Data

Jan. 8, 2014 (JP) .................................. 2014-001433
Jan. 8, 2014 (JP) .................................. 2014-001450

(51) Int. Cl.

| G06G 1/12 | (2006.01) |
| G06F 3/12 | (2006.01) |
| G06Q 20/20 | (2012.01) |
| G07G 5/00 | (2006.01) |
| G07G 1/14 | (2006.01) |

(52) U.S. Cl.
CPC ............ *G06Q 20/209* (2013.01); *G06F 3/1204* (2013.01); *G06F 3/1209* (2013.01); *G06F 3/1236* (2013.01); *G06F 3/1243* (2013.01); *G06F 3/1268* (2013.01); *G06F 3/1285* (2013.01); *G06F 3/1286* (2013.01); *G06Q 20/202* (2013.01); *G07G 1/14* (2013.01); *G07G 5/00* (2013.01)

(58) Field of Classification Search
CPC ............................. G06Q 20/20; G06Q 20/202
See application file for complete search history.

(56) References Cited

U.S. PATENT DOCUMENTS

| 2004/0041022 A1* | 3/2004 | Minowa et al. ............... 235/383 |
| 2009/0066996 A1* | 3/2009 | Minowa ....................... 358/1.15 |
| 2015/0106196 A1* | 4/2015 | Williams et al. ........... 705/14.51 |
| 2015/0124288 A1* | 5/2015 | Tajima et al. ................ 358/1.15 |

FOREIGN PATENT DOCUMENTS

EP 1577807 A1 9/2005

OTHER PUBLICATIONS

'Zebra Link-OS Version 1.0', Retrieved from the Internet: URL:http://www.acp-servicios.es/documentos/Zebra/linkos-datasheet-en-us.pdf [retrieved on Jun. 2, 2015], Jan. 1, 2013 (pp. 1-3).

* cited by examiner

*Primary Examiner* — Shelby Fidler

(57) ABSTRACT

A POS control system 1 has a POS terminal 8 that transmits print control data; a printer 12 including a print unit 41, a print control unit 29 that controls the print unit 41 based on the print control data, and a print data communication unit 26 that transmits the print control data by a first WebSocket connection CT1; and a print data process unit 51 that executes a process based on the received print control data.

6 Claims, 11 Drawing Sheets

FIG. 5

(A) RECEIPT

- R1: XXX STORE
- R2: 2013/1/1/12:00
- R3: ItemA 800 2 1600
       ItemB 900 3 2700
- R4: Total 4300
- R5: (barcode) 123456
- R6: membership NO. Q12345
- R7: Thank You (B) CONTROL COMMAND

- C1: GRAPHIC IMAGE PRINT INSTRUCTIONS COMMAND GC (XXX"IMAGE DATA FOR TOP LOGO IMAGE R1")
- C2: STRING STYLE COMMAND SC (RIGHT ALIGN)
      PRINT STRING INSTRUCTION COMMAND MC (YYY"2013/1/1/12:00")
      LINE FEED COMMAND LF
- C3: STRING STYLE COMMAND SC (LEFT ALIGN)
      PRINT STRING INSTRUCTION COMMAND MC (YYY"ItemA ΔΔ...")
      LINE FEED COMMAND LF
      ...
- C4: STRING STYLE COMMAND SC (BOLD + LEFT ALIGN)
      PRINT STRING INSTRUCTION COMMAND MC (YYY"Total ΔΔ...")
      LINE FEED COMMAND LF
- C5: BARCODE PRINT INSTRUCTIONS COMMAND C5
- C6: STRING STYLE COMMAND SC (LEFT ALIGN)
      PRINT STRING INSTRUCTION COMMAND MC (YYY"membership...")
      LINE FEED COMMAND LF
- C7: STRING STYLE COMMAND SC (CENTER)
      PRINT STRING INSTRUCTION COMMAND MC (YYY"Thank Δ You")
      LINE FEED COMMAND LF

PAPER CUT COMMAND SS

EXTRACTED STRING DATA

```
2013／1／1／12:00

ItemA        800      2     1600

ItemB        900      3     2700

Total                       4300 membership   NO.    Q123456

Thank You
```

| PRINTER IDENTIFICATION INFORMATION | RECORD CREATION DATE | EXTRACTED STRING DATA | PRINT CONTROL DATA | RECEIPT DATE DATA |

(B)

| PRINTER IDENTIFICATION INFORMATION | RECORD CREATION DATE | MEMBERSHIP NUMBER DATA | READ RESULT DATA | READ DATE | DEVICE IDENTIFICATION INFORMATION DATA |

FIG. 9

POS CONTROL SYSTEM, CONTROL METHOD OF A POS CONTROL SYSTEM, AND PRINTING DEVICE

Priority is claimed under 35 U.S.C. §119 to Japanese Application nos. 2014-001433 filed Jan. 8, 2014 and 2014-001450 filed Jan. 8, 2014 are hereby incorporated by reference in their entirety.

BACKGROUND

1. Technical Field

The present disclosure relates to a POS control system that includes a printing device, to a control method of the POS control system, and to a printing device.

2. Related Art

A system in which a POS terminal and a printing device are communicatively connected, and the printing device prints as controlled by the POS terminal is described, for example, in JP-A-2011-108097. In this type of system, the POS terminal normally sends print control data to the printing device, and the printing device prints based on the print control data. Systems in which the printing device connects to a server or other control device through a network, and the printing device communicates with the control device through the network, are also known.

In a system such as this in which print control data is sent from the POS terminal to the printing device, there is a need to be able execute processes on the control device using the print control data the POS terminal sends to the printing device when the printing device connects through the network to the server or other control device. In this event, it is also necessary for the system to be compatible with configurations in which the printing device and the control device communicate through the network.

SUMMARY

With consideration for the foregoing problem, present invention enables a control device connected through a network to a printing device to execute processes based on print control data in a POS control system in which a POS terminal sends print control data to the printing device, and makes the system compatible with configurations in which the printing device and the control device communicate through the network.

A POS (i.e., Point-Of-Sale) control system according to one aspect of the invention has: a POS terminal including a control unit that generates print control data based on a commercial (e.g. merchandise sales, merchandise return/refund, etc.) transaction process, and a communication unit that transmits the print control data; a printer including a print unit that prints, a print control unit that controls the print unit based on the print control data, a communication connection unit that connects to the POS terminal and receives the print control data, and a print data communication unit that transmits the print control data by a communication path by asynchronous duplex communication; and a control device including a reception unit that receives the print control data sent by the print data communication unit of the printer by the communication path, and a print data process unit that executes a process based on the received print control data.

In this aspect of the invention, the print control data sent from the POS terminal to the printer is sent by a function of the print data communication unit to the control device. As a result, the control device can execute a corresponding process based on the received print control data. The printer also sends the print control data to the control device by asynchronous duplex communication. The printer can therefore send the print control data to the control device when print control data is received from the POS terminal without synchronizing communication with the control device. As a result, in a POS control system in which print control data is sent from the POS terminal to the printer, a control device connected to the printer through a network can execute processes based on print control data, and the system can be made compatible with configurations in which a printer and a control device communicate through a network.

Preferably, the print control data is command data; and the print data processing unit of the control device extracts a string contained in the print control data, and generates text data containing the extracted string.

In this aspect of the invention, the control device generates text data containing a text string extracted from the print control data. The text data is data that can be used for data analysis using string searches, and the utility of the data is high. The control device can convert the received print control data to data with great utility.

Further preferably, the control device has a storage unit that relationally stores the print control data and the text data.

By storing print control data and text data based on the print control data, the control device in this aspect of the invention can later analyze the data and acquire information therefrom. Furthermore, by storing print control data, information that is lost when generating the text data based on the print control data can also be stored. Furthermore, because the print control data is stored, the print control data can also be used for reprinting.

In another aspect of the invention, the printer has a communication control unit that sends the print control data sent by the POS terminal to the print control unit and the print data communication unit.

Thus comprised, the print control data can be sent to the print control unit and printed by the print unit by a function of the communication control unit, and the print control data can be sent to the print data communication unit and the print control data sent to the control device by a function of this print data communication unit.

Further preferably, the print control unit of the printer sends report data indicating printing was done (i.e. completion-of-printing) to the communication control unit after (or upon completion of) printing by the print unit; and the communication control unit of the printer sends the print control data to the print data communication unit after receiving the report data.

Thus comprised, the printer can send the print control data related to printing to the control device after printing by the print unit is completed.

In another aspect of the invention, the print data processing unit of the control device executes a process based on the print control data and generates data; and the control device has a communication management unit that transmits the data generated by the print data processing unit; and the POS control system also has a management device having a device control unit that processes the data sent by the communication management unit of the control device, and sends the process result to the control device.

In this aspect of the invention, the print control data sent from the POS terminal to the printer is sent by a function of the print data communication unit to the control device by an asynchronous duplex communication path, and is processed by the control device. The data generated by a process of the control device is also sent to the management device, and the management device processes the data and sends the process result to the control device. As a result, the control device and the management device can execute corresponding processes based on the print control data the POS terminal sent to the printer. The printer also sends the print control data to the control device by asynchronous duplex communication. The printer can therefore send the print control data to the control device when print control data is received from the terminal without processing a communication request with the control device. As a result, in a POS control system in which print control data is sent from the POS terminal to the printer, and the printer and management device communicate with a control device through a network, the printer and management device can execute processes based on print control data, and the POS system can be made compatible with configurations in which a printer and a management device communicate with a control device In another aspect of the invention, the print control data is command data; and the data generated by the print data processing unit of the control device is text data containing a string from the print control data.

In this aspect of the invention, text data is data that can be used for data analysis using string searches, and the utility of the data is high. In this aspect of the invention, the control device can convert the received print control data to data with great utility.

In another aspect of the invention, the device control unit of the management device generates second print control data controlling the printer based on the received text data, and sends the second print control data to the control device; and the print data processing unit of the control device sends the received second print control data to the printer by the communication path.

Thus comprised, the printer can be controlled to print based on the process result of the management device.

In another aspect of the invention, the print control data is receipt data instructing the production of a receipt; the text data is data containing a string printed on the receipt; and the second print control data is data generated for producing a coupon when producing a coupon is decided based on evaluating the received text data to determine whether or not to produce a coupon.

This aspect of the invention enables controlling the printer to produce a coupon related to a receipt by a function of the management device.

In another aspect of the invention, the control device has a storage unit that stores the print control data and the data generated by the print data process unit.

In this aspect of the invention, the control device stores print control data and data based on the print control data, and this data can later be analyzed to acquire valuable information. Furthermore, by storing print control data, information that is lost when generating the text data based on the print control data can also be stored. Furthermore, because the print control data is stored, the print control data can also be used for reprinting.

Further preferably, the asynchronous duplex communication is WebSocket communication.

This aspect of the invention enables the printer and control device to communicate by asynchronous duplex communication through a WebSocket connection.

Another aspect of the invention is a control method of a POS control system, including: a POS terminal executing a commercial transaction process, generating print control data based on the commercial transaction process, and transmitting the print control data to a printer; and the printer receiving the print control data, printing based on the received print control data, and transmitting the print control data to a remote control device.

This aspect of the invention makes a POS control system compatible with configurations in which a printer and a control device communicate over a network.

Further preferably, the control device receives the print control data sent by the printer, processes the received print control data and generates data, and sends the generated data to a management device; and the management device receives the generated data the control device sent, processes the received generated data, and sends the process result to the control device.

In this aspect of the invention, the POS control system can be made compatible with configurations in which a printer and control device communicate over a network.

Another aspect of the invention is a printer including: a communication connection unit that connects to an external device and receives print control data sent by the external device; a print control unit that controls a print unit based on the print control data; and a print data communication unit that transmits the print control data by asynchronous duplex communication to a remote device other than the external device.

This aspect of the invention enables sending print control data sent from a POS terminal or other external device to a printer to a control server by asynchronous duplex communication, and executing a process based on the print control data on the control server. The printer transmits the print control data by asynchronous duplex communication. Therefore, when print control data is received from a POS terminal, the printer can transmit the print control data without synchronizing communication.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 shows an example of a receipt and print control data.

FIG. 8 shows an example of string extraction data.

FIG. 9 shows an example of the data structure of a record in a database managed on the control server.

DESCRIPTION OF EMBODIMENTS

A preferred embodiment of the present invention is described below with reference to the accompanying figures.

Figure 1:
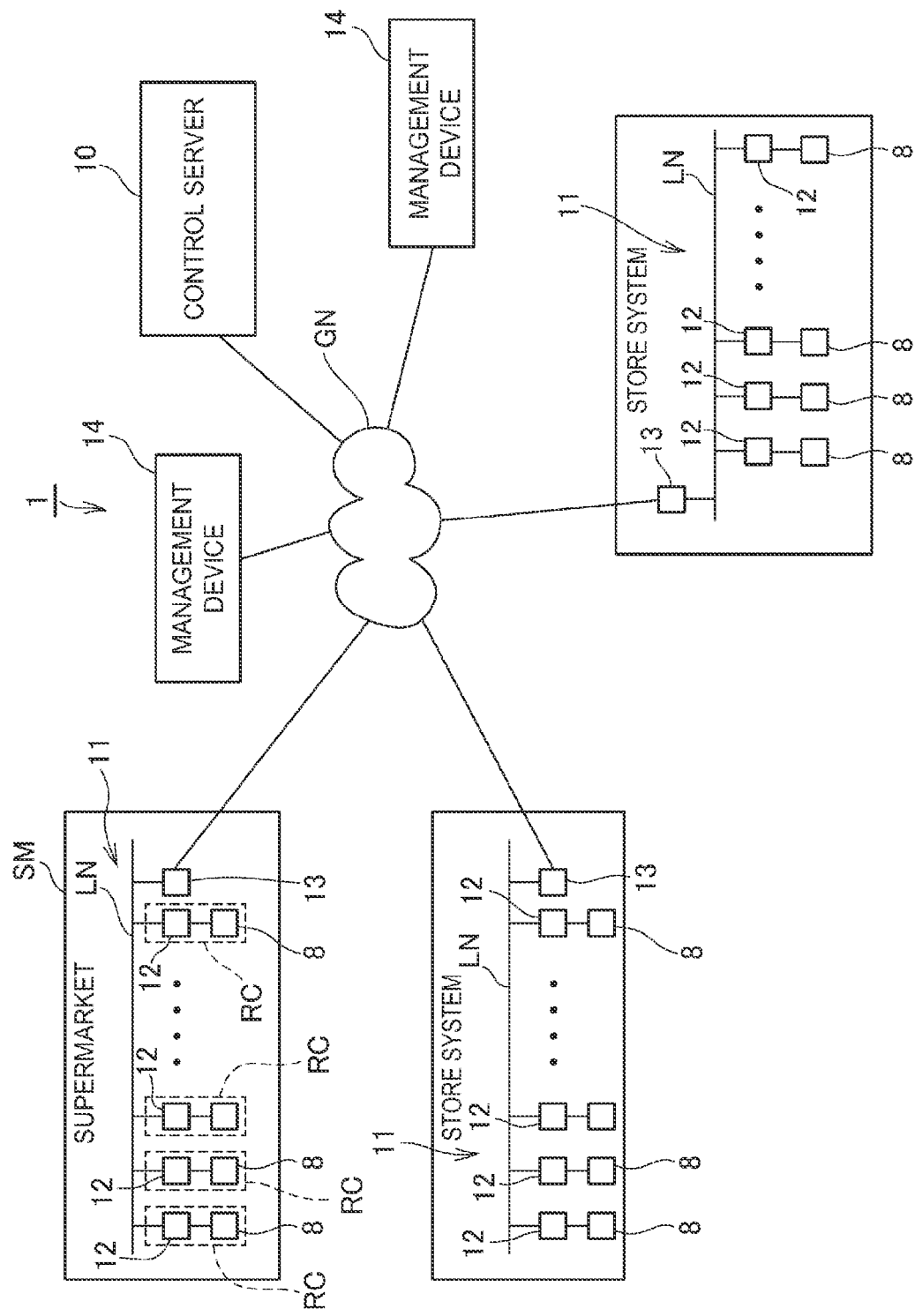
FIG. 1 shows the configuration of a control system according to an embodiment of the invention.

FIG. 1 shows the configuration of a POS control system 1 according to a preferred embodiment of the invention.

As shown in FIG. 1, the POS control system 1 includes a control server 10, and a plurality of store systems 11 connected to the control server 10 through the Internet or other network GN. Plural management devices 14 are also connected to the network GN.

The store system 11 is a system that is used in retail businesses such as supermarkets, convenience stores, department stores, and restaurants. The store system 11 has functions including producing receipts for customers of the business.

The store system 11 has one or more printers 12 each having a printing function for printing on print media and capable of producing receipts. Each printer 12 is connected to a local area network LN deployed in the store. The local area network LN connects to a network communication controller 13 configured with a communication device such as a network router or modem. Each printer 12 accesses the network GN through the network communication controller 13.

Each printer 12 connects to a POS terminal 8 in the store system 11. Each POS terminal 8 has a POS application and printer driver installed therein, and controls its corresponding printer 12 by functions of these programs. As described below, a printer driver has a function of generating print control data according to a command language of a printer 12.

Each POS terminal 8 generates and sends print control data for producing a receipt on its printer 12 and for controlling its printers using functions of the printer driver. While not shown in the figures, a barcode reader for reading barcodes from products and product packaging, and a card reader for reading cards such as customer membership cards, may also be connected to a POS terminal 8. Each POS terminal 8 may access a POS server, not shown, and may acquire specific information from product master and customer master databases stored on the POS server. When processing a purchase made by a customer in the store, a POS terminal 8 may acquires information from the product master and customer master, and generate print control data based on input from a barcode reader or card reader, or information inputted by a checkout clerk through a keypad or other input means.

In the example shown in FIG. 1, supermarket SM uses a store system 11. Plural checkout counters RC are set up in the supermarket SM, and a printer 12 and POS terminal 8 are installed at each checkout counter RC. Each POS terminal 8 sends print control data to its printer 12 and causes its printer 12 to produce a receipt appropriate to a transaction at the checkout counter RC. The printers 12 of the store system 11 are connected to the local area network LN, and access the network GN through the network communication controller 13.

In the POS control system 1 according to this embodiment of the invention, the printers 12 of store systems 11 establish a communication connection (or communication path) with the control server 10, and communicate with the control server 10. As described further below, through the communication path established with each printer 12, the control server 10 gets the data that the POS terminals 8 send to their printer 12, and executes an appropriate process based on the acquired data.

The management device 14 is a device that manages one or more store systems 11. For example, the management device 14 may be installed in the headquarters of a company that operates multiple stores, and manage the store systems 11 deployed in one or more stores associated with the corporate group. As described below, the management device 14 can acquire data based on data sent from a POS terminal 8 to a printer 12, and execute a corresponding process based on the acquired data.

Figure 2:
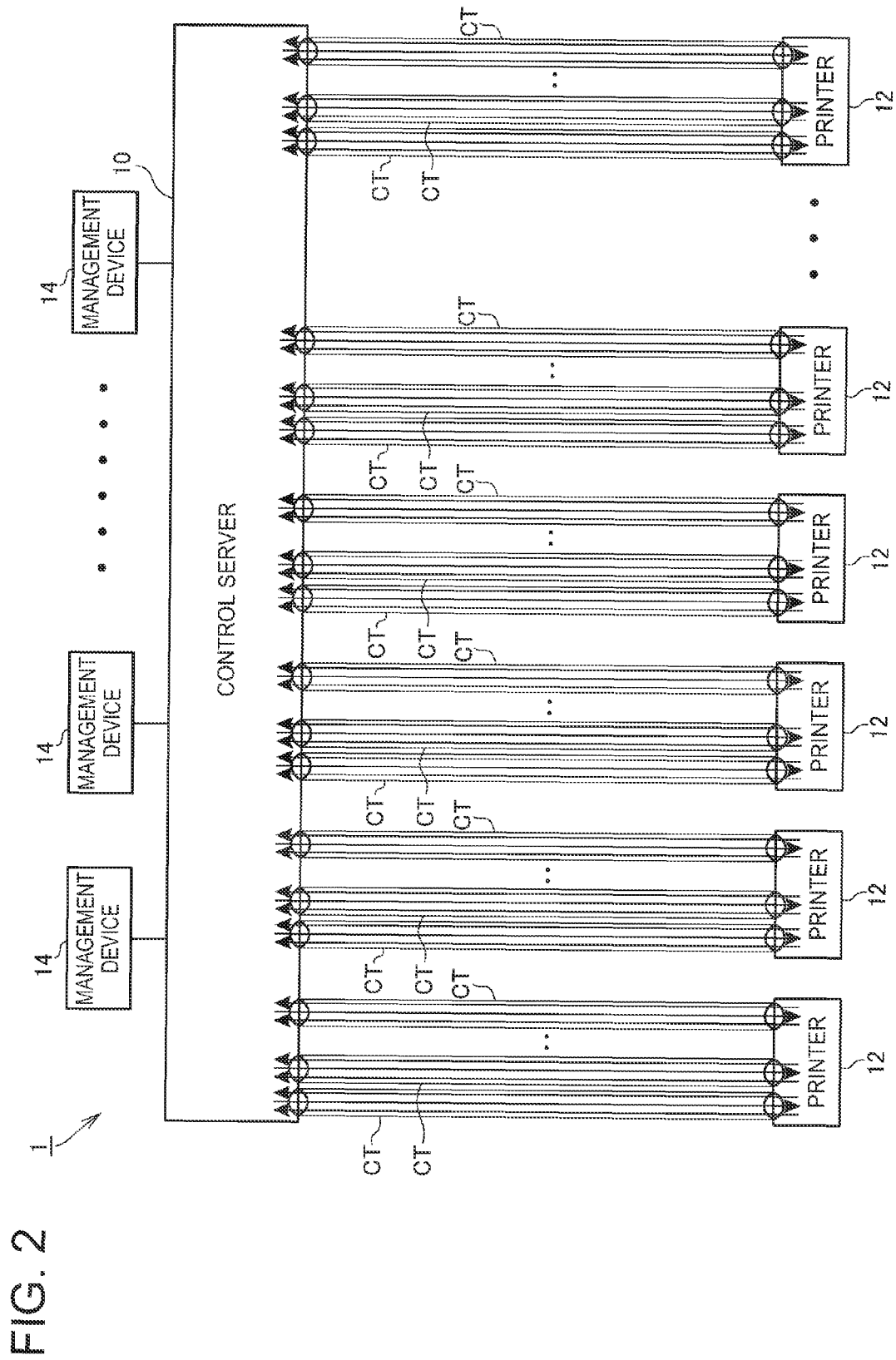
FIG. 2 illustrates communication paths opened between a control server and printing devices.

FIG. 2 illustrates the communication paths established between the control server 10 and the printers 12 in a POS control system 1.

As shown in FIG. 2, a WebSocket connection CT enabling WebSocket communication is established in the POS control system 1 between the control server 10 and the printers 12 in each store system 11.

A WebSocket is a communication standard that enables asynchronous duplex communication. After a server and client open a WebSocket connection CT using the WebSocket standard, full-duplex communication (e.g. simultaneous sending and receiving of data) between the server and client uses the WebSocket protocol by means of this connection. It is therefore not necessary to establish a new connection every time data is transmitted.

The WebSocket connection CT is a logical communication path for sending and receiving data according to the WebSocket standard and procedures between a printer 12 and the control server 10 connected through the WebSocket connection CT. Therefore, once a printer 12 and control server 10 handshake and establish a WebSocket connection CT, the printer 12 and control server 10 can exchange data asynchronously over the WebSocket connection CT. More specifically, the control server 10 can send data to the printer 12 through the WebSocket connection CT at any time, and the printer 12 can send data to the control server 10 at any desired time through the WebSocket connection CT.

WebSocket communication is asynchronous, duplex communication between a printer 12 and control server 10 through the WebSocket connection CT based on the WebSocket protocol and methods.

By establishing a WebSocket connection CT, a printer 12 and the control server 10 can communicate by a synchronous, duplex communication. The control server 10 can push data to the printer 12 at any desired time by WebSocket communication through the WebSocket connection CT without receiving a request from the printer 12 operating as a client device. Likewise, the printer 12 can push data to the control server 10 through the WebSocket connection CT at any time.

In this embodiment as described further below, the printer 12 has multiple function units (described below), and a WebSocket connection CT is established with the control server 10 according to the plural function units. Plural WebSocket connections CT may therefore be opened between a single printer 12 and the control server 10.

As also shown in FIG. 2, the control server 10 is also communicatively connected to the plural management devices 14.

In this embodiment of the invention the control server 10 is a client server in a so-called cloud system in which the printers 12 and management devices 14 are client devices. The control server 10 can process data, execute specific processes when triggered by receiving a request from a printer 12, a request from a management device 14, and when specific conditions are met, and send data based on the result of any of the specific processes through the WebSocket connection CT to the printer 12 or the management device 14.

In FIG. 2, the control server 10 is represented as a single block, but this does not mean that the control server 10 is configured from a single server. For example, the control server 10 may be configured from multiple servers, or it may be a server rendered by a function of a specific system. More specifically, the control server 10 may be any configuration that can execute the processes described herein.

The control server 10 and a printer 12 communicate according to the WebSocket communication protocol in this embodiment. The invention is not limited to WebSocket communication, however, and other configurations enabling devices to communicate by asynchronous, duplex communication similarly to WebSocket communication may be used.

The POS control system 1 thus has multiple (such as a 1000) printers 12 each capable of printing and communicatively connected through a WebSocket connection CT to a control server 10.

Such a configuration enables the following.

The control server 10 can collect data received from the plural printers 12 connected to plural store systems 11, and manage and analyze information based on the collected data. The control server 10 can therefore accumulate information. The accumulated information can be used as so-called "big data." The control server 10 can also send data from the printers 12 through the network GN to external devices including the management devices 14.

A printer 12 can also be controlled by a function of the control server 10 to execute processes other than printing processes based on control of the POS terminal 8. More particularly, the configuration of the POS control system 1 according to this embodiment enables causing the printer 12 to execute processes by a function of the control server 10 by the simple task of connecting a printer 12 to the network GN. Furthermore, as described below, this embodiment of the invention enables executing processes on a printer 12 using functions of the control server 10 without modifying the existing system to which the printer 12 and POS terminal 8 are connected, and without affecting the existing system.

In addition, because printers 12 from different store systems 11 are connected to the control server 10 by a WebSocket connection CT, the control server 10 can manage the plural printers 12 connected in the plural store systems 11. The control server 10 can also control operation of the plural printers 12 connected in the plural store systems 11.

Figure 3:
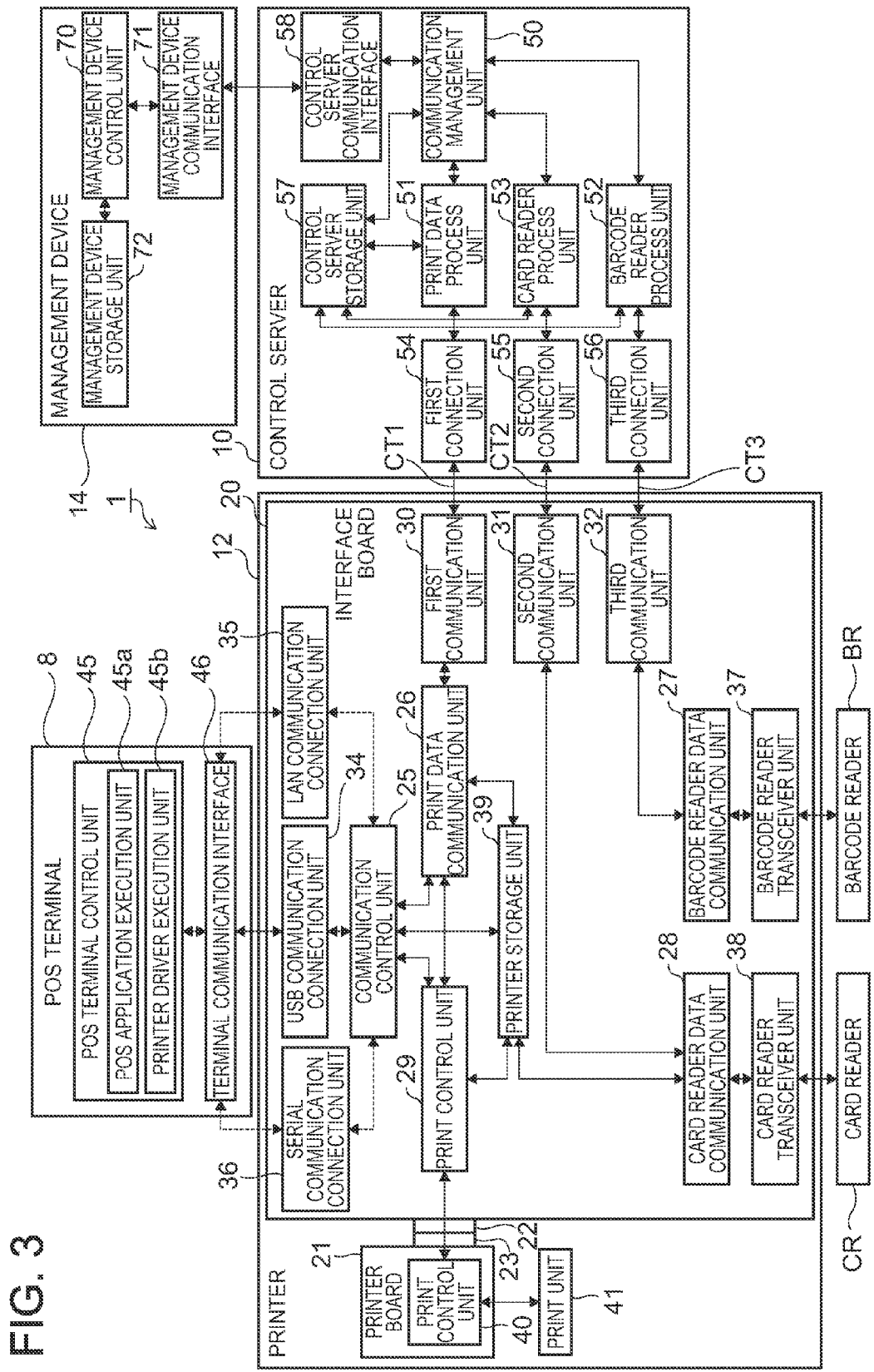
FIG. 3 is a block diagram showing the functional configuration of devices in the control system.

FIG. 3 is a block diagram showing the functional configuration of the printer 12, the POS terminal 8, the control server 10, and the management device 14 in this embodiment of the invention.

Note that in the blocks illustrating the printer 12 in FIG. 3, function blocks are shown inside blocks indicating circuit boards (or circuit functionality blocks), specifically interface board 20 and printer board 21. This means the function of one function block is embodied by specific software and hardware (such as a CPU) mounted on the circuit board corresponding to the one function block.

As shown in FIG. 3, the printer 12 has an interface board 20 and a printer board 21, and these boards are connected by a first connector 22 disposed to the interface board 20, and a second connector 23 disposed to the printer board 21.

The interface board 20 of the printer 12 includes a communication control unit 25, a print data communication unit 26, a barcode reader data communication unit 27, a card reader data communication unit 28, a print control unit 29, a first communication unit 30, a second communication unit 31, a third communication unit 32, a USB communication connection unit 34 (communication connection unit), a LAN communication connection unit 35 (communication connection unit), a serial communication connection unit 36 (communication connection unit), a barcode reader transceiver unit 37, a card reader transceiver unit 38, and a printer storage unit 39.

The functions of the communication control unit 25, print data communication unit 26, barcode reader data communication unit 27, card reader data communication unit 28, print control unit 29, first communication unit 30, second communication unit 31, and third communication unit 32 are described further below.

The POS terminal 8 can communicate with the printer 12 using any of the USB, Ethernet (T), and RS-232C serial communication standards.

The USB communication connection unit 34 is connected to a USB port not shown, and communicates by means of the USB standard with POS terminal 8 connected through a USB cable.

The LAN communication connection unit 35 is connected to a LAN port not shown, and communicates by means of the Ethernet standard with POS terminal 8 connected through a LAN cable.

The serial communication connection unit 36 is connected to a serial port not shown, and communicates by means of a serial communication standard with POS terminal 8 connected through a serial cable.

The barcode reader transceiver unit 37 communicates according to a specific communication protocol with a barcode reader BR connected to a port of a specific standard as controlled by the barcode reader data communication unit 27. The barcode reader BR is a device that optically reads barcodes.

The card reader transceiver unit 38 communicates according to a specific communication protocol with a card reader CR connected to a port of a specific standard as controlled by the card reader data communication unit 28. The card reader CR is a device that reads information recorded on a card.

The printer storage unit 39 stores data. The printer storage unit 39 stores first destination data 391*a* (not shown), second destination data 392*a* (not shown), third destination data 393*a* (not shown), and printer identification data 39*b* (not shown), which are described further below.

The printer board 21 of the printer 12 has a print control unit 40. The function of the print control unit 40 is described further below.

The printer 12 also has a print unit 41. A paper roll of print media is set in the printer 12. The print unit 41 has various mechanisms and devices for producing receipts, including a print mechanism for printing on the roll paper, a conveyance mechanism for conveying the roll paper, and a cutter mechanism for cutting the roll paper.

When referring to without specifically differentiating between the print data communication unit 26, barcode reader data communication unit 27, and the card reader data communication unit 28 below, these function blocks are collectively referred to as function units.

As shown in FIG. 3, the POS terminal 8 includes a POS terminal control unit 45 (control unit) and a terminal communication interface 46 (communication unit).

The POS terminal control unit 45 includes a CPU, ROM, RAM, and other peripheral circuits, and controls the POS terminal 8. The function blocks of the POS terminal control unit 45 include a POS application execution unit 45*a* and a printer driver execution unit 45*b*.

The function of the POS application execution unit 45*a* is determined by the POS application installed on the POS terminal 8. Based on input from the barcode reader, card reader, and input by the checkout clerk to input means such as a keypad according to the transaction performed at the checkout counter RC, the POS application execution unit 45*a* acquires information from the product master and customer master databases, generates print information data including information related to printing, and outputs to the printer driver execution unit 45*b*.

The printer driver execution unit 45*b* is executed according to functions of the printer driver installed on the POS terminal 8. Based on the print information data received from the POS application execution unit 45*a*, the printer driver execution unit 45b generates and output print control data according to the command language of the print unit 41 of the printer 12.

The terminal communication interface 46 communicates according to a specific communication protocol with the printer 12 as controlled by the POS terminal control unit 45.

In this embodiment of the invention, the POS terminal control unit 45 and the printer 12 are connected by a USB cable and communicate according to the USB standard.

As shown in FIG. 3, the control server 10 includes a communication management unit 50, a print data process unit 51, barcode reader process unit 52, a card reader process unit 53, a first connection unit 54, a second connection unit 55, a third connection unit 56, a control server storage unit 57 (storage unit), and a control server communication interface 58.

The functions of the communication management unit 50, print data process unit 51, barcode reader process unit 52, card reader process unit 53, first connection unit 54, second connection unit 55, and third connection unit 56 are described further below.

The control server storage unit 57 stores data. The control server storage unit 57 stores a connection management database 57a (not shown), a print control data database 57b (not shown), a management device database 57c (not shown), a membership number database 57d (not shown), and a store information management database 57e (not shown). The data stored in these databases is described further below.

The control server communication interface 58 communicates according to a specific communication protocol with external devices including the management devices 14 through the network GN.

As shown in FIG. 3, the management device 14 has a management device control unit 70, a management device communication interface 71, and a management device storage unit 72.

The management device control unit 70 includes a CPU, ROM, RAM, and other peripheral circuits, and controls the management device 14.

The management device communication interface 71 communicates with the control server 10 through the network GN.

The management device storage unit 72 stores data. The management device storage unit 72 stores a conditions database 72a (not shown) as described further below.

FIG. 3 shows the relationship between the control server 10 and one printer 12 connected to the control server 10. When multiple printers 12 are connected to the control server 10, the control server 10 establishes a separate WebSocket connection CT with each printer 12, and communicates with the printers 12 by means of the WebSocket standard through their respective WebSocket connection CT.

As shown in FIG. 3, the printer 12 has three function units, a print data communication unit 26, a barcode reader data communication unit 27, and a card reader data communication unit 28. Three WebSocket connections CT corresponding to the three function units are opened between the printer 12 and control server 10. More specifically, a first WebSocket connection CT1 corresponding to the print data communication unit 26, a second WebSocket connection CT2 corresponding to the card reader data communication unit 28, and a third WebSocket connection CT3 corresponding to the barcode reader data communication unit 27 are established.

The operation of the printer 12 and the control server 10 when opening a WebSocket connection CT is described below using establishing the third WebSocket connection CT3 as an example.

Figure 4:
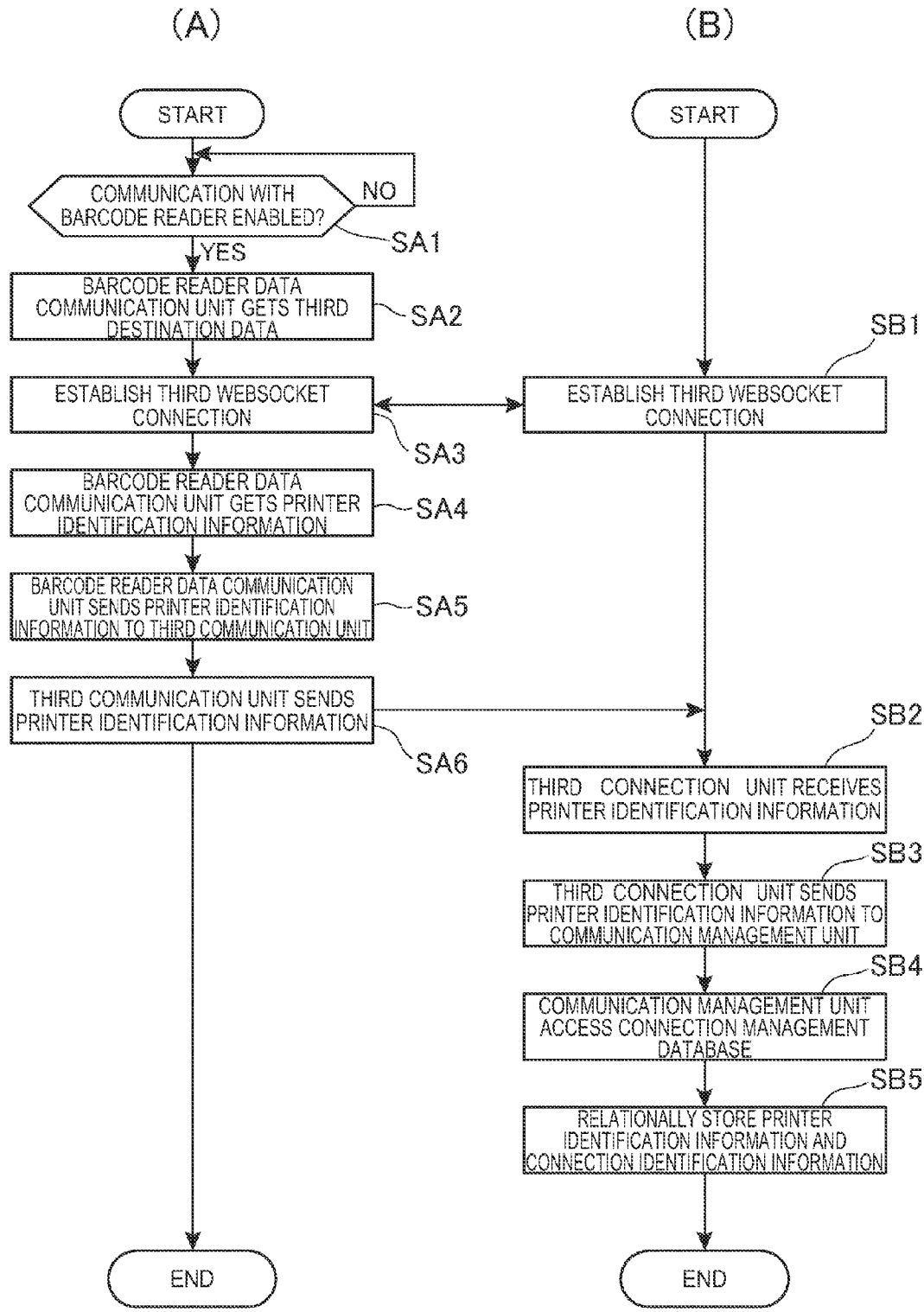
FIG. 4 is a flowchart showing the operation of a printing device and the control server.

FIG. 4 is a flow chart showing the operation of the printer 12 and control server 10 when establishing a third WebSocket connection CT3. Column (A) shows the operation of the printer 12, and column (B) shows the operation of the control server 10.

At the time the operation described in the flow chart starts, the printer 12 is connected to the local area network LN in the corresponding store system 11, and can access the network GN.

In addition, the operation shown in the flowchart in FIG. 4 executes when the printer 12's power turns on, when the printer 12 is communicatively connected to the network GN, and when an appropriate command is issued by the user.

In addition, in the following description, the functions of the communication control unit 25, print data communication unit 26, barcode reader data communication unit 27, card reader data communication unit 28, and print control unit 29 of the printer 12, and the print data process unit 51 and barcode reader process unit 52 of the control server 10, may be achieved as follows.

These function blocks are, for example, software objects. An object is an instance created in an object-oriented programming language, and more specifically is a software function block defined by a set of data and methods. The function of a particular function block is executed by calling (invoking) a method embedded in the function block.

The functions of these function blocks may also be rendered by the CPU or other hardware assets reading and running an application. A configuration in which the function of a single function block is rendered by a single application, a configuration in which the functions of plural function blocks are rendered by a single application, and a configuration in which the function of a single function block is rendered by plural applications, are possible.

In other words, the function blocks represent functions as blocks, and do not mean any specific application or hardware construction.

As shown in FIG. 4, column (A), the barcode reader data communication unit 27 of the printer 12 checks if communication with the barcode reader BR is enabled (step SA1).

Communication between the barcode reader data communication unit 27 and barcode reader BR is enabled when the barcode reader BR is connected to the printer 12. If the barcode reader BR has a power supply, communication is enabled when the power of the connected barcode reader BR is turned on.

When communication with the barcode reader BR is enabled (step SA1 returns YES), the barcode reader data communication unit 27 accesses the printer storage unit 39, and gets the third destination data 393a stored in the printer storage unit 39 (step SA2).

The third destination data 393a is data identifying the address (such as the domain name, IP address, or path name) of the control server 10 to access when establishing the third WebSocket connection CT3. When opening a WebSocket connection CT according to the WebSocket protocol, the client (the printer 12 in this example) handshakes with the server (the control server 10 in this example) using HTTP (Hypertext Transfer Protocol). When handshaking, the client sends a message containing the address of the server, and the third destination data 393a contains the address of the destination.

The address of the destination when establishing a WebSocket connection CT differs according to the function unit of the printer 12. In this example, the print control unit 29, barcode reader data communication unit 27, and card reader data communication unit 28 are function units of different types. The address accessed when the print data communication unit 26 establishes a first WebSocket connection CT1, the address accessed when the card reader data communication unit 28 establishes a second WebSocket connection CT2, and the address accessed when the barcode reader data communication unit 27 establishes a third WebSocket connection CT3, are different. The printer storage unit 39 stores the first destination data 391*a*, second destination data 392*a*, and third destination data 393*a*. The first destination data 391*a* includes the address to access when the print data communication unit 26 establishes a first WebSocket connection CT1. The second destination data 392*a* contains the address to access when the card reader data communication unit 28 establishes a second WebSocket connection CT2. The third destination data 393*a* contains the address to access when the barcode reader data communication unit 27 establishes a third WebSocket connection CT3.

Next, the barcode reader data communication unit 27 accesses the control server 10 based on the address identified by the third destination data 393*a*. The barcode reader data communication unit 27 then establishes the third WebSocket connection CT3 between the barcode reader process unit 52 of the control server 10, the third communication unit 32, and the third connection unit 56 (step SA3, step SB1). The barcode reader data communication unit 27 of the printer 12 establishes the third WebSocket connection CT3 when triggered by becoming able to communicate with the barcode reader BR without receiving a request from the control server 10.

The third communication unit 32 and third connection unit 56 are WebSocket interfaces enabling data communication based on the WebSocket protocol and methods. These function blocks are instantiated using a WebSocket Socket.IO library, for example.

The third communication unit 32 has functions for processing data that is received from the barcode reader data communication unit 27 according to WebSocket, and sending the data through the third WebSocket connection CT3 based on WebSocket methods. The third communication unit 32 also has functions for processing data that is received through the third WebSocket connection CT3 according to WebSocket, and sending to the barcode reader data communication unit 27. The first communication unit 30, second communication unit 31, first connection unit 54, second connection unit 55, and third connection unit 56 are similarly configured.

Next, the barcode reader data communication unit 27 accesses the printer storage unit 39 and gets the printer identification information 39*b* stored in the printer storage unit 39 (step SA4). The printer identification information 39*b* is data representing the identification information of the printer 12 (referred to below as printer identification information). The printer identification information is, for example, a serial number assigned to the printer 12 when the printer 12 is manufactured.

Next, the barcode reader data communication unit 27 sends the printer identification data 39*b* to the third communication unit 32 (step SA5).

The third communication unit 32 sends the received printer identification data 39*b* through the third WebSocket connection CT3 to the control server 10 (step SA6).

With reference to FIG. 4, column (B), the third connection unit 56 of the control server 10 receives the printer identification data 39*b* through the third WebSocket connection CT3 (step SB2). Next, the third connection unit 56 sends the received printer identification data 39*b* to the communication management unit 50 (step SB3).

Next, the communication management unit 50 accesses the connection management database 57*a* stored in the control server storage unit 57 (step SB4). The connection management database 57*a* is a database relationally storing connection identification information identifying the WebSocket connection CT and the printer identification information of the printer for the WebSocket connections CT that were established with the printers 12.

Next, the communication management unit 50 creates one record in the connection management database 57*a*. The communication management unit 50 then relationally stores in the created record the connection identification information of the WebSocket connection CT established in step SB1 (the third WebSocket connection CT3 in this example) and the printer identification information indicated by the printer identification data 39*b* that was received (step SB5).

Note that when a WebSocket connection CT is opened, the communication management unit 50 generates connection identification information for that connection that is different from the connection identification information of any other WebSocket connection CT that was already opened. The relationship between the WebSocket connections CT and printers 12 is managed by the process of step SB5.

The barcode reader data communication unit 27 of the printer 12 thus establishes a third WebSocket connection CT3 when triggered by becoming able to communicate with the barcode reader BR without receiving a request from the control server 10. Thus comprised, the user does not need to perform a complicated operation to open a third WebSocket connection CT3. Special knowledge is also not needed to open a WebSocket connection CT.

A third WebSocket connection CT3 is also established after communication with the barcode reader BR is enabled and an event occurs that may result in data being sent from the barcode reader BR to the barcode reader data communication unit 27. As a result, the process of establishing a third WebSocket connection CT3 is not executed when not necessary, an open third WebSocket connection CT3 is not maintained unnecessarily, and resources can be used effectively.

Operation of the printer 12 and control server 10 when establishing a third WebSocket connection CT3 is described above, and similar processes are executed when establishing the first WebSocket connection CT1 and when establishing the second WebSocket connection CT2.

The process of establishing the first WebSocket connection CT1 is described below.

When the printer 12 power turns on, the print data communication unit 26 checks whether or not data was received from the communication control unit 25. The process of the communication control unit 25 sending data to the print data communication unit 26 is described further below.

When print control data is received from the communication control unit 25 after the printer 12 power turns on, the print data communication unit 26 establishes a first WebSocket connection CT1 between the print data process unit 51 of the control server 10 and the first connection unit 54 of the first communication unit 30. The communication management unit 50 stores connection identification information for the connection and the printer identification information of the printer 12 in the connection management database 57*a* according to the connection.

The print data communication unit 26 of the printer 12 thus establishes the first WebSocket connection CT1 when triggered by receiving data from the communication control unit 25 after the power turns on. After establishing the connection, the print data communication unit 26 sends and receives data through the connection.

The process of establishing the second WebSocket connection CT2 is described with reference to the flow chart in FIG. 4.

In step SA1 of FIG. 4, column (A), the card reader data communication unit 28 of the printer 12 checks if communication with the card reader CR is enabled.

Communication between the card reader data communication unit 28 and the card reader CR is enabled when the card reader CR is connected to the printer 12. If the card reader CR has a power supply, communication is enabled when the power of the connected card reader CR turns on.

When communication with the card reader CR is enabled (step SA1 returns YES), the card reader data communication unit 28 establishes the second WebSocket connection CT2 in the same way as described above. The communication management unit 50 of the control server 10 then relationally stores connection identification information for the second WebSocket connection CT2 and the printer identification information of the printer 12 in the connection management database 57a.

A WebSocket connection CT is thus established for each function unit between the printer 12 and the control server 10. As a result, one function unit can send and receive data with a process unit of the control server 10 independently of the other function units and without being affected by or affecting communication with other process units.

A first WebSocket connection CT1 is thus established between the first communication unit 30 and first connection unit 54.

In conjunction therewith, a first function unit communication path KT1 based on the first WebSocket connection CT1 is established between the print data communication unit 26 of the printer 12, and the print data process unit 51 of the control server 10. The first function unit communication path KT1 is a logical communication path for data communication between the print data communication unit 26 and print data process unit 51. The print data communication unit 26 and print data process unit 51 can communicate by asynchronous duplex communication through the first function unit communication path KT1. Asynchronous duplex communication through the first function unit communication path KT1 is described further below.

By establishing the second WebSocket connection CT2, a second function unit communication path KT2 is likewise opened between the card reader data communication unit 28 of the printer 12 and the card reader process unit 53 of the control server 10. The card reader data communication unit 28 and the card reader process unit 53 communicate by asynchronous duplex communication through the second function unit communication path KT2.

By establishing the third WebSocket connection CT3, a third function unit communication path KT3 is likewise opened between the barcode reader data communication unit 27 of the printer 12 and the barcode reader process unit 52 of the control server 10. The barcode reader data communication unit 27 and the barcode reader process unit 52 communicate by asynchronous duplex communication through the third function unit communication path KT3.

The POS control system 1 is constructed using the printer 12 and an existing system comprising the POS terminal 8. In the existing system, the POS terminal 8 generates and sends print control data to the printer 12 by functions of a POS application and printer driver. Based on the print control data, the printer 12 prints with the print unit 41.

One objective of the POS control system 1 according to the invention is to use the print control data the POS terminal 8 sends to the printer 12 without modifying the POS terminal 8 (for example, without changing the program of the POS application).

More specifically, by installing the interface board 20 in the printer 12 in the POS control system 1, the functions of the printer 12 are expanded. The printer 12 is able to send print control data through the network GN to the control server 10 by means of these added functions. In addition, the control server 10 can execute processes such as described below based on the received print control data.

The content of the print control data the POS terminal 8 sends is described below with reference to specific examples, and processing based on the print control data by devices of the control server 10 are then described.

FIG. 5, column (A) shows an example of a receipt produced by the printer 12. FIG. 5, column (B) shows the content of the print control data resulting in printing the receipt shown in FIG. 5, column (A).

As shown in FIG. 5, column (A), a top logo image R1 illustrating a top logo is printed at the top of the receipt.

A receipt date image R2 showing the date and time the receipt was produced is printed below the top logo image R1. The string (a text string of the date and time) shown in the receipt date image R2 is preferably printed right aligned.

A purchased product image R3 is printed below the receipt date image R2. The purchased product image R3 is an image showing each of the products the customer purchased in a list including the name of the product the customer purchased, the unit price of the product, the quantity of each product purchased, and the total for each product (the amount calculated from the unit price of the product multiplied by the quantity). The string for each line is preferably printed left aligned in the purchased product image R3.

A total amount image R4 showing the total of all purchased products is printed below the purchased product image R3. The string related to the total amount image R4 is preferably printed left aligned and in boldface.

A barcode image R5 showing a barcode representation of a receipt identification number is printed below the total amount image R4.

A membership number image R6 showing the membership number of the customer may be printed below the barcode image R5. The string in the membership number image R6 is preferably printed left aligned. A card reader that reads the membership card of the customer is connected to the POS terminal 8 in this example. When the customer presents a membership card in a transaction at the checkout counter RC, the membership card is read with the card reader. The membership number read by the card reader is then stored in a specific storage area of the POS terminal 8.

An end image R7 showing a default string recorded at the end of each receipt is printed below the membership number image R6. In this example, the string in the end image R7 says "Thank [ ] You" (where the square brackets [ ] represent a space, here and below). The string in the end image R7 is preferably printed centered.

Note that the layout of the receipt is simplified in FIG. 5, column (A). Tax-related information, and information related to change due to the customer is also commonly printed on a receipt in addition to the information described above.

As shown in FIG. 5, column (B), the print control data is composed of plural commands.

As shown in FIG. 5, column (B), the print control data includes a top logo print instructions command C1. This top logo print instructions command C1 is a command that instructs printing the top logo image R1. The top logo print instructions command C1 includes a graphic image print instructions command GC. A graphic image print instructions command GC includes a command code instructing printing a graphic image, and print data for the graphic image to be printed. The image data is, for example, data that stores information such as a gray scale level for each pixel in bitmap data. In this embodiment, the graphic image print instructions command GC is in the format (XXX "image data") (where XXX is a command code instructing printing an image based on the image data). The graphic image print instructions command GC in the top logo print instructions command C1 is in the format (XXX "image data for top logo image R1").

Next after the top logo print instructions command C1 in the print control data is a print date instructions command C2. The print date instructions command C2 is a command instructing printing the receipt date image R2, and includes a string style command SC, a print string instruction command MC, and a line feed command LF.

The string style command SC is a command specifying the style to apply when printing the string specified by the print string instruction command MC. A style means applying some process related to drawing the printed string. Styles include, for example, moving the position of the string (left-aligned, centered, right-aligned, for example), or enlarging, reducing, rotating, emphasizing, bolding, or adding a styled character or style symbol to the string. The string style command SC in the print date instructions command C2 in this example instructs applying right-aligned styling to the printed string.

The print string instruction command MC is a command specifying a specific string and instructing printing the specified string. The print string instruction command MC includes a command code instructing printing a string, and a data packet specifying the string. A combination of characters expressed by a specific character code (such as Unicode or ASCII) is written in the data packet. The print string instruction command MC in the print date instructions command C2 in this example is in the format (YYY "2013/1/1/12:00") (where YYY is the command code instructing printing a string, and the content between double quotation marks is the data packet specifying the string to be printed). Font data for each character that can be printed by the printer 12 is previously registered in the printer 12. The print control unit 40 of the printer 12 converts each character to be printed to font data based on the print string instruction command MC, and prints based on the converted font data.

The line feed command LF is a command instructing a line feed.

A line item print instructions command C3 is written next after the print date instructions command C2 in the print control data. A line item print instructions command C3 is added for each purchased product.

The line item print instructions command C3 includes a string style command SC instructing applying a left-aligned style. The line item print instructions command C3 also includes a print string instruction command MC specifying a string (that may express the product name, product price, purchased quantity, and line item total) and instructing printing of the string. The line item print instructions command C3 also includes a line feed command LF.

A transaction total print instructions command C4 is included next after the line item print instructions commands C3 in the print control data. This transaction total print instructions command C4 includes a string style command SC instructing applying bold and left-align styles. The transaction total print instructions command C4 also includes a print string instruction command MC specifying the string "Total" and a string denoting the receipt total, and instructing printing of the strings. The transaction total print instructions command C4 also includes a line feed command LF.

Next, after the transaction total print instructions command C4 in the print control data, is a barcode print instructions command C5. This barcode print instructions command C5 is a command specifying the code, and instructing printing of a barcode image R5 representing the specified code. The printer 12 has a function for generating image data for the barcode based on the code specified by the barcode print instructions command C5, and printing a barcode image R5 based on the generated image data.

Next after the barcode print instructions command C5 in the print control data is a membership number print instructions command C6. This membership number print instructions command C6 includes a string style command SC instructing applying the left-align style. The membership number print instructions command C6 also includes a print string instruction command MC specifying the string "membership [ ] NO." and a string denoting the membership number, and instructing printing the strings. The membership number print instructions command C6 also includes a line feed command LF.

Next after the membership number print instructions command C6 in the print control data is an end image print instructions command C7. The end image print instructions command C7 includes a string style command SC instructing applying the center style. The end image print instructions command C7 also includes a print string instruction command MC specifying the string "Thank [ ] You" and instructing printing the string The end image print instructions command C7 also includes a line feed command LF.

Following the end image print instructions command C7 in the print control data is a paper cut command SS. This paper cut command SS is a command instructing cutting the roll paper. The paper cut command SS is the last command in the print control data instructing producing a receipt.

Operation of devices in the POS control system 1 when the POS terminal 8 sends print control data to a printer 12 is described next.

Figure 6:
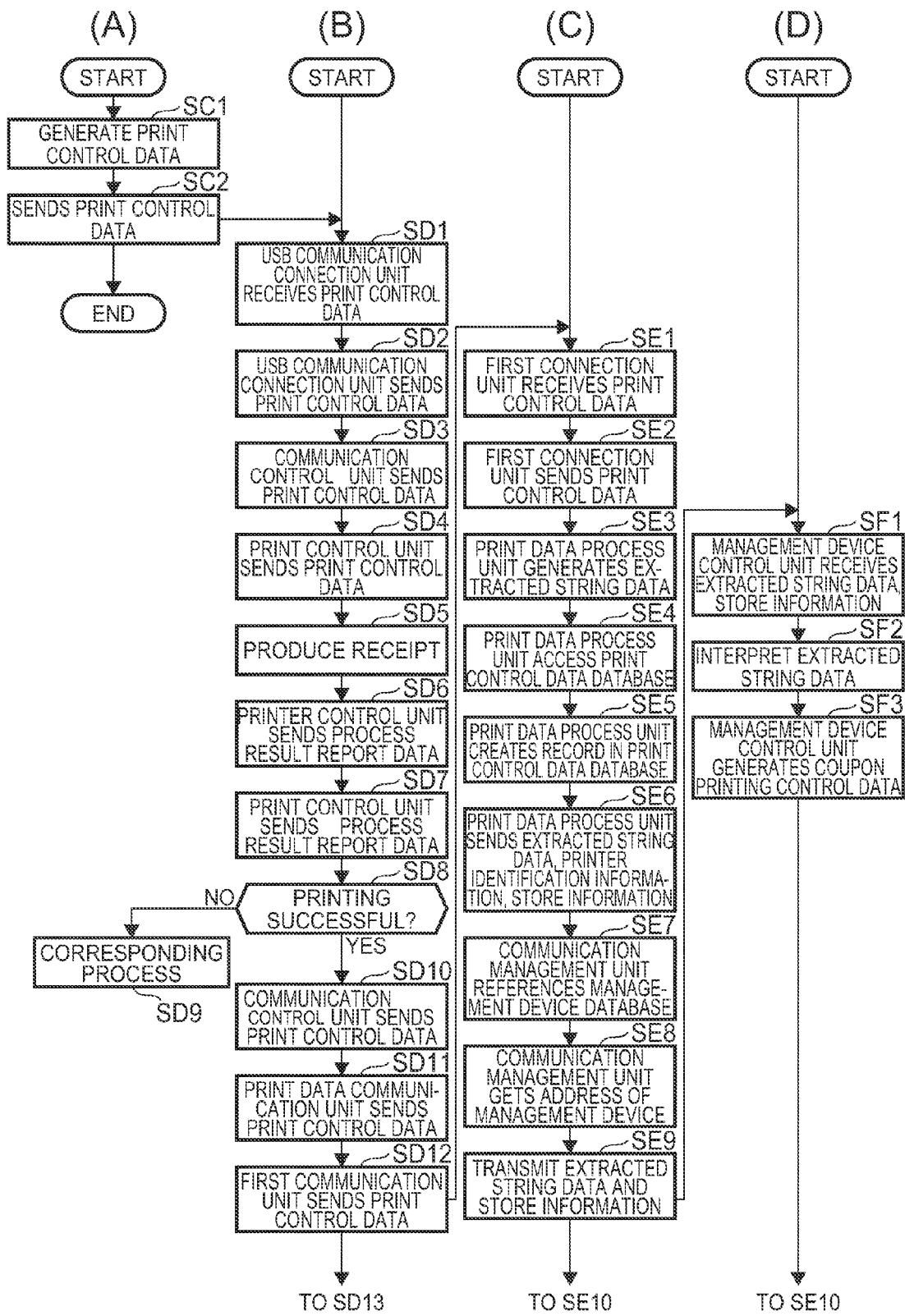
FIG. 6 is a flow chart showing the operation of devices in the control system.
Figure 7:
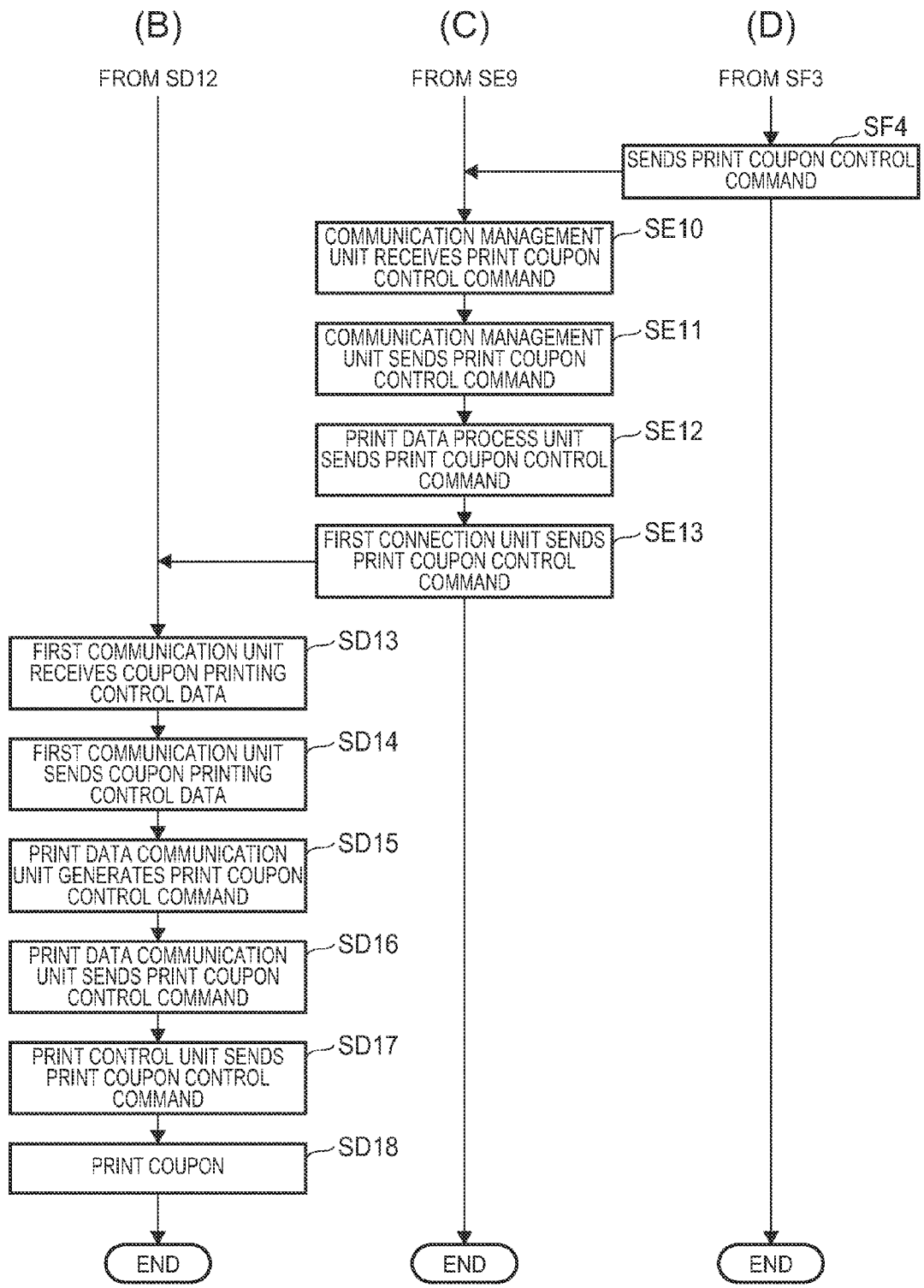
FIG. 7 is a flow chart showing the operation of devices in the control system.

FIG. 6 and FIG. 7 are a flow chart showing the operation of devices in the POS control system 1 when the POS terminal 8 sends print control data to a printer 12. In FIG. 6, column (A) shows the operation of the POS terminal 8, column (B) shows the operation of the printer 12, column (C) shows the operation of the control server 10, and column (D) shows the operation of the management device 14.

Asynchronous duplex communication between the print data communication unit 26 and the print data process unit 51 through the first function unit communication path KT1 is also described below.

As shown in FIG. 6, column (A), the POS application execution unit 45a and printer driver execution unit 45b of the POS terminal control unit 45 of the POS terminal 8 generate print control data based on a transaction process at the checkout counter RC (step SC1). The print control data is data instructing producing a receipt based on the transaction process at the checkout counter RC. The print control data generated in step SC1 is binary data. In the following description, the content of the print control data generated in step SC1 is the content of the print control data shown as an example in FIG. 5, column (B).

Next, the POS terminal control unit 45 controls the terminal communication interface 46 and sends the print control data to the printer 12 (step SC2).

As shown in FIG. 6, column (B), the USB communication connection unit 34 receives the print control data sent from the POS terminal 8 (step SD1). As described above, in this example, the POS terminal 8 and printer 12 are preferably connected by a USB cable. Next, the USB communication connection unit 34 sends the received print control data to the communication control unit 25 (step SD2).

The communication control unit 25 stores the received print control data in a work area formed in RAM. The communication control unit 25 sends the print control data to the print control unit 29 (step SD3).

The print control unit 29 establishes communication with the print control unit 40, and sends the print control data to the print control unit 40 (step SD4). The print control unit 29 and the print control unit 40 communicate by USB. In step SD4, the print control unit 29 sends the print control data to the print control unit 40. The first connector 22 and second connector 23 that connect the interface board 20 and printer board 21 are USB connectors.

Note that the communication standard for communication between the print control unit 29 and print control unit 40 is not limited to USB. Communication based on the Serial Peripheral Interface (SPI) specification or other communication specification may also be used.

The print control unit 40 is a control circuit that controls the print unit 41 based on the print control data and operates the print unit 41. After receiving the print control data, the print control unit 40 controls the print unit 41 based on the print control data and produces a receipt such as shown in the example in FIG. 5, column (A), (step SD5).

More specifically in step SD5, the print control unit 40 prints the top logo image R1 based on the top logo print instructions command C1. To print the top logo image R1, the print control unit 40 draws the image data of the top logo image R1 contained in the graphic image print instructions command GC in an image buffer not shown. Next, the print control unit 40 controls the print mechanism, conveyance mechanism, and other mechanisms of the print unit 41 to print the top logo image R1 based on the image data drawn in the image buffer.

Next, the print control unit 40 prints the receipt date image R2 based on the print date instructions command C2. To print the receipt date image R2, the print control unit 40 converts the string specified by the print string instruction command MC to font data, applies the styles specified by the string style command SC, and writes the font data to the image buffer. Next, the print control unit 40 controls the print mechanism, conveyance mechanism, and other mechanisms of the print unit 41 to print the receipt date image R2 based on the image data drawn in the image buffer.

The print control unit 40 likewise prints the purchased product image R3 and total amount image R4 based on the line item print instructions command C3 and transaction total print instructions command C4.

Next, the print control unit 40 prints the barcode image R5 based on the barcode print instructions command C5. To print the barcode image R5, the print control unit 40 generates image data of the barcode image R5 based on the code specified by the barcode print instructions command C5. Next, the print control unit 40 controls the print mechanism, conveyance mechanism, and other mechanisms of the print unit 41 to print the barcode image R5 based on the image data of the barcode image R5 written to the image buffer.

Next, the print control unit 40 prints the membership number image R6 and end image R7 based on the membership number print instructions command C6 and end image print instructions command C7.

Next, the print control unit 40 controls the cutter mechanism, conveyance mechanism, and other mechanisms based on the paper cut command SS to cut the roll paper.

A receipt shown in the example in FIG. 5, column (A) is thus produced based on the example of print control data shown in FIG. 5, column (B).

When producing a receipt based on the print control data is completed, the print control unit 40 generates and sends process result report data indicating the process result to the print control unit 29 (step SD6). The process result report data indicates if producing a receipt ends normally, and when producing a receipt fails, indicates the failure and cause. In this example, producing a receipt ended normally in step SD5, and in step SD6 the print control unit 40 sends process result report data indicating normal completion.

The print control unit 29 then sends the received process result report data to the communication control unit 25 (step SD7).

The communication control unit 25 then determines if the content of the received process result report data indicates the receipt production ended normally (step SD8).

If the content of the process result report data does not indicate that receipt production ended normally (step SD8: NO), the communication control unit 25 executes a corresponding process (step SD9). For example, the communication control unit 25 may send the process result report data to the POS terminal 8. Based on the process result report data, the POS terminal 8 reports to the user that receipt production failed, for example. Further alternatively, the communication control unit 25 controls a reporting means such as an LED disposed to the printer 12 to report to the user that receipt production failed.

If the content of the process result report data indicates that receipt production ended normally (step SD8: YES), the communication control unit 25 sends the print control data stored in the work area to the print data communication unit 26 (step SD10).

The specific operation in step SD10 is described next.

As described above, the communication control unit 25 stores the received print control data in a work area. This work area functions as a receive buffer. When storing data to the work area, the communication control unit 25 sequentially stores the commands contained in the print control data to the work area. While storing the commands in the print control data to the work area, the communication control unit 25 checks if the command stored to the work area is a paper cut command SS. If it is a paper cut command SS, the communication control unit 25 gets data indicating the current date (date and time) (referred to below as the receipt date) based on output from a RTC (real-time clock) not shown. The method of acquiring the current receipt date is not limited to the foregoing, and any method may be used. The date and time indicated by the receipt date data corresponds to the date and time the receipt was produced.

In step SD10, the communication control unit 25 adds the time data to the beginning of the print control data, and outputs to the print data communication unit 26. How the time data is used is described further below.

When receipt production by the print unit 41 ended normally in this embodiment, the communication control unit 25 sends the print control data to the print data communication unit 26. This has the following effect. Specifically, as will be understood below, the print control data sent to the print data communication unit 26 is also sent to the control server 10. The control server 10 stores the print control data and data based on the print control data. Because the print control data is sent from the communication control unit 25 to the print data communication unit 26 when receipt production ends normally, the print control data related to the receipt that was actually produced is sent to the control server 10 and is stored by the control server 10. If receipt production fails, the print control data related to the receipt that was not produced is not sent to the control server 10 and is not stored by the control server 10. Therefore, the control server 10 can store print control data corresponding to an issued receipt, and data based on the print control data.

The print data communication unit 26 then sends the received print control data to the first communication unit 30 (step SD11).

The specific operation in step SD11 is described below.

As described with reference to FIG. 5, column (B), the print control data contains multiple commands specifying printing images, and has a paper cut command SS as the last command.

The print data communication unit 26 receives the commands contained in the print control data from the communication control unit 25, and determines receiving the print control data for one receipt is completed when the paper cut command SS is received. In step SD11, the print data communication unit 26 then sends all commands received between when the last paper cut command SS was received and the new paper cut command SS is received (including the newly received paper cut command SS) as the print control data for one receipt to the first communication unit 30.

Thus comprised, even when print control data for plural receipts is sent from the communication control unit 25 to the print data communication unit 26, the print data communication unit 26 can send the print control data for each single receipt to the first communication unit 30 as print control data for different receipts.

The first communication unit 30 uses the first WebSocket connection CT1 to send the received print control data to the control server 10 (step SD12). In step SD12, the receipt date data is added to the beginning of the print control data the first communication unit 30 sends.

As shown in FIG. 6, column (C), the first connection unit 54 of the control server 10 receives the print control data through the first WebSocket connection CT1 (step SE1). Next, the first connection unit 54 sends the received print control data to the print data process unit 51 (step SE2).

The print data process unit 51 stores the received print control data in the work area reserved in RAM. Next, based on the received print control data, the print data process unit 51 extracts the strings to be printed on the receipt based on the print control data, and generates extracted string data, which is a text file containing the extracted strings (step SE3).

The operation of step SE3 is described next using the print control data example shown in FIG. 5, column (B).

First, the print data process unit 51 generates the extracted string data, which is a text file.

Next, the print data process unit 51 processes the top logo print instructions command C1. The print data process unit 51 reads the graphic image print instructions command GC from the top logo print instructions command C1, and determines this command is not a command instructing printing a string. This decision is made by, for example, identifying the command code. The print data process unit 51 therefore does not extract a string from the top logo print instructions command C1.

Next, the print data process unit 51 processes the print date instructions command C2. The print data process unit 51 reads the print string instruction command MC in the print date instructions command C2, and determines this command is a command instructing printing a string. This decision is made by, for example, identifying the command code. The print data process unit 51 then reads the data packet in the print string instruction command MC, and converts the string specified in the data packet to text. Next, the print data process unit 51 writes the string converted to text (in this example, the string 2013/1/1/12:00) in the extracted string data, and adds a line feed command LF.

The print data process unit 51 thus sequentially processes the commands contained in the print control data, and when the processed command is a command specifying printing a string, extracts and converts the string to text, writes the text string to the extracted string data, and adds a line feed.

FIG. 8 illustrates the content of the extracted string data generated from the print control data in FIG. 5, column (B).

As shown in FIG. 8, the strings printed on the receipt (see FIG. 5, column (A)) are contained as text in the extracted string data.

Next, the print data process unit 51 accesses the print control data database 57*b* stored in the control server storage unit 57 (step SE4).

FIG. 9, part (A) illustrates the data structure of a record in the print control data database 57*b*.

As shown in FIG. 9, part (A), one record in the print control data database 57*b* relationally stores the printer identification information, record creation date, extracted string data, print control data, and receipt date data. Note that the record creation date is information identifying when the record was created.

Next, the print data process unit 51 creates one record in the print control data database 57*b*. In this record, the print data process unit 51 stores the printer identification information of the printer 12 that sent the print control data; the record creation date showing when the record was created; the extracted string data generated from the received print control data; the received print control data; and the receipt date added to the received print control data (step SE5).

In step SE5, the print data process unit 51 gets the printer identification information as described below. Specifically, the print data process unit 51 first gets the connection identification information of the WebSocket connection CT (first WebSocket connection CT1 in this example) used to receive the print control data. Next, the print data process unit 51 references the connection management database 57*a* stored by the control server storage unit 57. As described above, the connection identification information and the printer identification information of the established WebSocket connection CT are relationally stored in the connection management database 57*a*. Next, the print data process unit 51 gets the printer identification information related to the connection identification information from the connection management database 57*a* using the acquired connection identification information as the search key.

Note that as described above, the extracted string data is a text file containing the strings printed on the receipt, and the print control data is binary data.

The printer identification information and the record creation date contained in the record can also be used as the search key when looking for a desired record in the print control data database 57*b*.

As described above, the control server 10 according to this embodiment relationally stores the print control data and extracted string data based on the print control data when print control data is received from a printer 12. This has the following effect.

Specifically, as described further below, the extracted string data is sent to the management device 14, and the management device 14 executes processes based on the extracted string data. Even when the information printed on a receipt is not a string, it is information that can be later used. For example, the top logo print instructions command C1 can be used to know the top logo printed on the receipt. The barcode print instructions command C5 can be used to know the receipt identification information. Therefore, by storing the print control data, information other than string data can later be used.

Furthermore, by storing the print control data, a receipt can be re-issued using the print control data.

Next, the print data process unit 51 sends the extracted string data, data identifying the printer identification information of the printer 12 that sent the print control data, and data identifying the store information (described below) to the communication management unit 50 (step SE6).

The operation of step SE6 is described below.

The control server storage unit 57 stores a store information management database 57*e*.

The store information management database 57*e* is a database relationally storing printer identification information to store information. The store information is information including the name of the store where the related printer 12 is used, and identification information for the store. The address, telephone number, and other information about the store may also be included in the store information.

In step SE6, the print data process unit 51 references the store information management database 57*e*. Next, the print data process unit 51 searches the store information management database 57*e* using the printer identification information as the search key to get the store information related to the search key. Next, the print data process unit 51 sends data indicating the extracted string data and the printer identification information with the store information data to the communication management unit 50.

The communication management unit 50 references the management device database 57*c* stored by the control server storage unit 57 (step SE7).

The management device database 57*c* is a database relationally storing, for each printer 12 connected to the control server 10, the printer identification information of the printer 12, and the address of the management device 14 corresponding to that printer 12. That one printer 12 and one management device 14 correspond to each other means that said one printer 12 is installed in the store system 11 managed by that one management device 14, and that one printer 12 is controlled by that one management device 14.

Next, using the printer identification information identified by the data received from the print data process unit 51 as the search key, the communication management unit 50 acquires the address of the management device 14 related to the printer identification information from the management device database 57*c* (step SE8).

Next, the communication management unit 50 controls the control server communication interface 58 to send the extracted string data and store information data to the management device 14 of the address acquired in step SE8 (step SE9).

As shown in FIG. 6, column (D), the management device control unit 70 controls the management device communication interface 71 and receives the extracted string data and store information data (step SF1).

Next, the management device control unit 70 references the conditions database 72*a* stored by the management device storage unit 72, and executes an extracted string interpreting process (step SF2).

This extracted string interpreting process is described next.

The extracted string interpreting process is a process in which the management device control unit 70 interprets the strings contained in the extracted string data to determine whether or not to issue a coupon, and if a coupon is to be issued, acquires coupon content information indicating the content of the coupon to issue.

The conditions database 72*a* is a database relationally storing conditions for issuing coupons, and the coupon content information, which is information indicating the content of the coupon to issue when the condition is met. There may be plural conditions.

One example of a condition for issuing a coupon is that the membership number of the customer in the transaction is a specific number. In this event, the management device control unit 70 executes the following process. Specifically, the management device control unit 70 searches the extracted string data using the string "membership [ ] NO." as the search key, and acquires the string on the same line as the search key as the membership number of the customer. Next, the management device control unit 70 determines if the acquired membership number of the customer matches the specific number. If the acquired customer membership number matches the specific number, the management device control unit 70 determines to issue a coupon because the condition is met. Next, the management device control unit 70 references the conditions database 72*a*, and gets the coupon content information related to the condition that was met.

Another example of a condition for issuing a coupon is that a product of a specific product name is purchased. In this event, the management device control unit 70 executes the following process. Specifically, the management device control unit 70 searches the extracted string data using the specific product name as the search string. If the condition is met, the management device control unit 70 determines to issue a coupon because the condition is met. Next, the management device control unit 70 references the conditions database 72*a*, and gets the coupon content information related to the condition that was met.

Another example of a condition for issuing a coupon is that the total purchase exceeds a specific amount. In this event, the management device control unit 70 executes the following process. Specifically, the management device control unit 70 searches the extracted string data using the string Total as the search key, and gets the value of the string contained on the same line as the search key as the total of the purchased products. Next, the management device control unit 70 determines if the total of the purchased products exceeds the specific amount. If the total of the purchased products exceeds the specific amount, the management device control unit 70 determines to issue a coupon because the condition is met. Next, the management device control unit 70 references the conditions database 72*a*, and gets the coupon content information related to the condition that was met.

The condition may also be configured to change dynamically according to the time of day or the member. More specifically, any condition that can be evaluated based on information contained in the extracted string data and other information may be used.

For example, in step SF1 the management device control unit 70 receives store information data with the extracted string data. The store information data can then be used in the condition. For example, that the purchase is made at a specific store may be included in the condition. As a result, the content of the coupon can be changed according to the store. In this case, the name of the store can also be printed on the coupon.

Because a specific condition is met in the extracted string interpreting process in step SF2 in this example, the management device control unit 70 determines to issue a coupon and gets the corresponding coupon content information.

After the extracted string interpreting process in step SF2, the management device control unit 70 generates coupon printing control data (second print control data) (step SF3).

The coupon printing control data is an XML (eXtensible Markup Language) file containing information to be printed by the printer 12. Information to be printed by the printer 12, including image data and information indicating the printing position, is contained in an XML format in the coupon printing control data. The coupon printing control data also contains the printer identification information of the printer 12 that is to print the coupon.

The management device control unit 70 also has a function for generating coupon printing control data for producing a coupon of the content in the coupon content information based on the coupon content information acquired by the extracted string interpreting process in step SF2.

As shown in FIG. 7, column (D), the management device control unit 70 controls the management device communication interface 71 to send the generated coupon printing control data to the control server 10 (step SF4).

As shown in FIG. 7, column (C), the communication management unit 50 of the control server 10 controls the control server communication interface 58 to receive the coupon printing control data (step SE10). Next, the communication management unit 50 sends the received coupon printing control data to the print data process unit 51 (step SE11).

The print data process unit 51 sends the received coupon printing control data to the first connection unit 54 (step SE12).

The first connection unit 54 sends the received coupon printing control data through the first WebSocket connection CT1 to the printer 12 (step SE13).

As shown in FIG. 7, column (B), the first communication unit 30 of the printer 12 receives the coupon printing control data through the first WebSocket connection CT1 (step SD13). Next, the first communication unit 30 sends the received coupon printing control data to the print data communication unit 26 (step SD14).

The print data communication unit 26 then converts the received coupon printing control data to a print coupon control command, which is a command in the command language of the printer 12 (step SD15). The print data communication unit 26 converts the coupon printing control data, which is an XML file, to commands that can be interpreted by the print control unit 40, which is a control circuit of the print unit 41.

Next, the print control unit 17 sends the print coupon control command to the print control unit 29 (step SD16).

The print control unit 29 establishes communication with the print control unit 40, and sends the print coupon control command to the print control unit 40 (step SD17).

Based on the received print coupon control command, the print control unit 40 controls the print unit 41 and prints the coupon (step SD18).

After printing a coupon, the printer 12, control server 10, and management device 14 execute the following process.

The print control unit 40 of the printer 12 generates coupon printing result report data indicating the result of the coupon printing process. The coupon printing result report data is data indicating when producing a coupon ends normally, and when producing a coupon fails, indicates the failure and cause.

The print control unit 40 sends the generated coupon printing result report data to the print control unit 29. The print control unit 29 sends the received coupon printing result report data to the print data communication unit 26. The print data communication unit 26 sends the received coupon printing result report data through the first WebSocket connection CT1 to the print data process unit 51 of the control server 10.

The print data process unit 51 sends the received coupon printing result report data to the communication management unit 50. The communication management unit 50 controls the control server communication interface 58, and sends the received coupon printing result report data to the management device control unit 70 of the management device 14.

The management device control unit 70 then displays the result of the coupon printing process based on the coupon printing result report data on the display panel of the management device 14.

As a result of this process, the administrator of the management device 14 can know whether or not the coupon was printed normally by looking at the display panel, and if printing failed, can execute an appropriate process such as determining the cause.

As described above, the printer 12 can send print control data sent from the POS terminal 8 to the control server 10 by an extension function embedded in the interface board 20, that is, by the function of the communication control unit 25 and print data communication unit 26. Because the printer 12 transmits the print control data using the first WebSocket connection CT1, the print control data can be sent without a process of establishing a new connection when the print control data is received from the POS terminal 8.

Furthermore, in this embodiment, the control server 10 stores the print control data received from the printer 12 and extracted string data based on the print control data. This data is valuable data that can be used to analyze product sales trends, total sales, customer shopping patterns, and other information by store or printer 12. More specifically, the control server 10 according to this embodiment stores information using the print control data sent from POS terminals 8 to printers 12.

Furthermore, in this embodiment, extracted string data is sent from the control server 10 to the management device 14. Based on the extracted string data, the management device 14 determines whether or not to issue a coupon to the customer. The management device 14 can therefore determine whether or not to issue a coupon according to the content of the transaction, such as the customer, the products purchased by the customer, or the content of a customer transaction.

In addition, when issuing a coupon, the management device 14 produces a coupon of content corresponding to the satisfied condition. As a result, the management device 14 can produce coupons of content appropriate to the customer, the products purchased by the customer, or the content of the customer transaction, for example.

The management device 14 can also use the print control data sent from the POS terminal 8 to the printer 12 to execute processes such as issuing a corresponding coupon.

When there is a command to issue a coupon (transmission of coupon printing control data) from the management device 14 to the control server 10, the control server 10 uses the first WebSocket connection CT1 to send the coupon printing control data. As a result, the control server 10 can send coupon printing control data to the printer 12 without executing a process such as opening a new connection. After a receipt is produced by a printer 12, a coupon corresponding to the receipt can therefore be printed by the same printer 12.

Furthermore, in this embodiment, the control server 10 and the management device 14 can execute the foregoing processes without changing the content of the print control data the POS terminal 8 sends to the printer 12. In other words, the control server 10 and management device 14 according to this embodiment of the invention can execute such processes without modifying the POS terminal 8 (including modifying the POS application program). The POS control system 1 can therefore be built from an existing system comprising a POS terminal 8 and printer 12 without changing the configuration of the existing system, and the POS control system 1 can be constructed easily.

As described above, the communication control unit 25 adds receipt date data to the print control data, and sends the print control data with the receipt date data to the print data communication unit 26 (step SD10). The print data communication unit 26 then sends the print control data with the added receipt date data to the control server 10 (step SD11, 12).

The receipt date data can be used as described below.

Before sending the print control data in step SD11, the print data communication unit 26 checks if data can be communicated normally through the first WebSocket connection CT1. This check is done as described below, for example.

The print data communication unit 26 sends a response request to the print data process unit 51 through the first WebSocket connection CT1. The print data process unit 51 has a function for sending a response command when a response request command is received. When the print data process unit 51 receives a response command to the transmission of the response request command within a specific time, it determines that data communication through the first WebSocket connection CT1 is possible. However, if the print data process unit 51 does not receive a response command to the transmission of the response request command within the specific time, it determines that data communication through the first WebSocket connection CT1 is not possible. The method of checking if communication is possible is not limited to the foregoing.

Data communication through a WebSocket connection CT is not possible in some cases due to communication-related errors.

The process described with reference to the flow chart above is executed when normal data communication through the WebSocket connection CT is possible.

However, when normal data communication through the WebSocket connection CT is not possible, the print data communication unit 26 executes the following process.

The print data communication unit 26 stores the print control data in a specific storage area of the printer storage unit 39. If the printer 12 has a slot for a removable storage medium such as an SD card, a configuration that stores the print control data on the removable storage medium is also conceivable.

After storing the print control data to the storage area, the print data communication unit 26 monitors whether or not normal data communication is possible through the first WebSocket connection CT1. The print data communication unit 26 monitors if communication is possible as described below. That is, the print data communication unit 26 regularly sends a request response command through the first WebSocket connection CT1. If a response to the request response command is received, the print data communication unit 26 determines that normal data communication through the first WebSocket connection CT1 is possible.

When normal data communication through the first WebSocket connection CT1 is possible, the print data communication unit 26 accesses the printer storage unit 39, and sends the print control data stored in the storage unit to by the first WebSocket connection CT1. The receipt date data is added to the print control data.

The print data process unit 51 of the control server 10 that received the print control data then creates one record in the print control data database 57*b*. In this record, the print data process unit 51 stores the printer identification information of the printer 12 that sent the print control data; the record creation date showing when the record was created; the extracted string data generated from the received print control data; the received print control data; and the receipt date data added to the received print control data (step SE5).

The receipt date data is stored in the record the print data process unit 51 created in step SE5. The receipt date data is data corresponding to when the receipt was printed.

Storing the receipt date data in the record corresponding to the received print control data has the following effect. If the time the receipt was produced and the time the corresponding print control data was sent to the control server 10 differ because data could not be communicated normally over the first WebSocket connection CT1, when the receipt was produced can be acquired by getting the receipt date data from the corresponding record. As a result, the number of receipts produced in specific periods of time can be surveyed based on the print control data database 57*b*, for example.

Furthermore, communication delays over the first WebSocket connection CT1 can be identified by analyzing the difference between the creation date and time of one record and the date and time indicated by the receipt date data.

As described above, the printer 12 prints receipts based on print control data sent from a POS terminal 8, and prints coupons based on coupon printing control data sent from a management device 14 through a control server 10.

As a result, the print control data and coupon printing control data could possibly be sent at overlapping times to the printer 12. In this event, the printer 12 executes processes appropriate to the data as described below.

Figure 10:
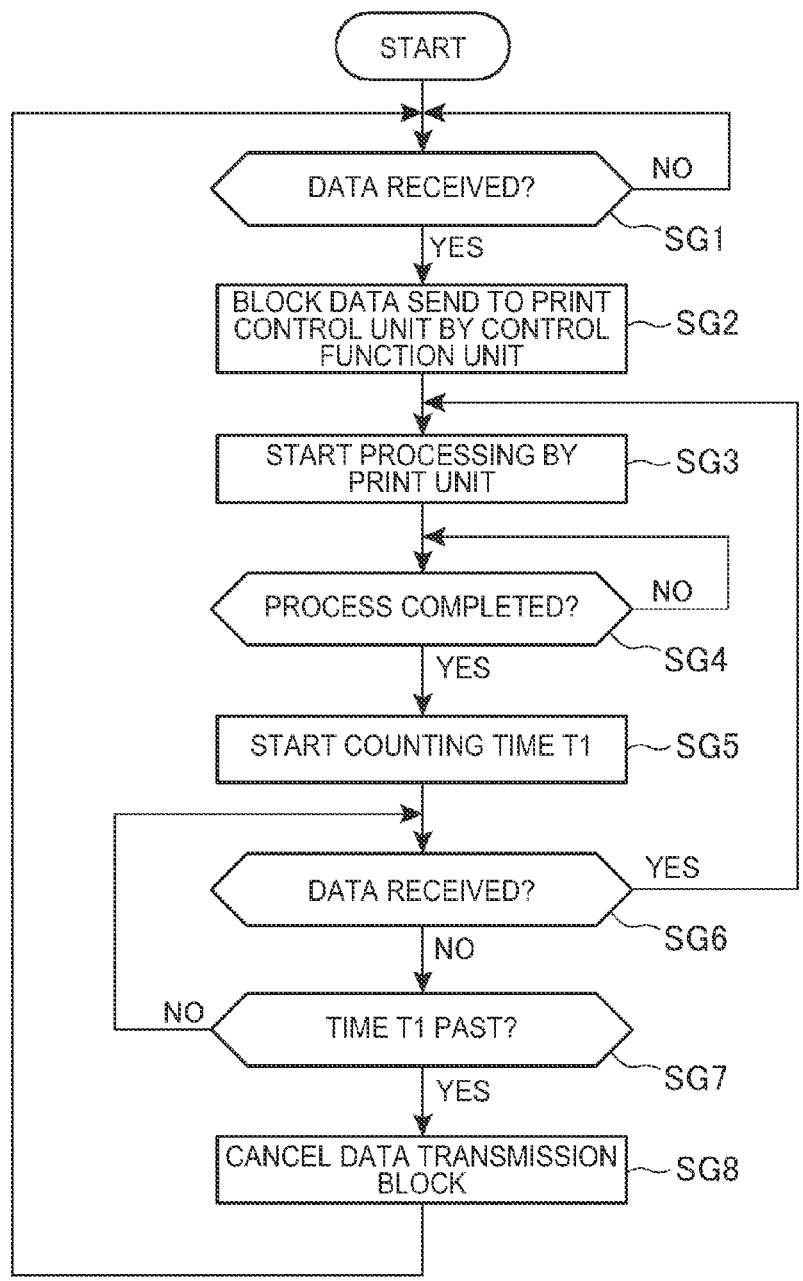
FIG. 10 is a flow chart showing the operation of the printing device.

FIG. 10 is a flow chart of the operation of the printer 12.

In the description of operation shown in FIG. 10, the communication control unit 25 and print data communication unit 26 are referred to collectively as a "control function unit" unless specifically identifying them.

The print control unit 29 of the printer 12 monitors if print control data is received from the communication control unit 25, or coupon printing control data is received from the print data communication unit 26 (step SG1).

Monitoring in step SG1 may be done as described below.

For example, the print control unit 29 checks the status of a receive buffer that temporarily stores the data received by the communication control unit 25, and the status of a receive buffer that temporarily stores the data received by the print data communication unit 26. If data is written to either receive buffer, the print control unit 29 determines that the corresponding control function unit received data.

If either control function unit received data (step SG1: YES), the print control unit 29 prohibits transmission of data to the print control unit 29 by the control function unit that did not send the data to the print control unit 29 (step SG2). Below, the control function unit that sent data to the print control unit 29 is referred to as the "target control function unit," and the control function unit that did not send data to the print control unit 29 is referred to as the "non-target control function unit."

In step SG2, the print control unit 29 prohibits the print data communication unit 26 from sending a print coupon control command to the print control unit 29 if print control data is received from the communication control unit 25. If print control data is received from the print data communication unit 26, the print control unit 29 prohibits the communication control unit 25 from sending print control data to the print control unit 29.

In step SG2, the print control unit 29 sends a transmission blocked notice indicating the transmission of data to the print control unit 29 is prohibited to the non-target control function unit. When a control function unit receives this notice and then receives data from an external device (POS terminal 8 or control server 10), it holds data received from the external device in the receive buffer instead of sending the data to the print control unit 29 until a transmission block cancel notice indicating that the prohibition of data transmission (described below) is cancelled is received.

Next, the print control unit 29 receives data from the target control function unit, sends the received data to the print control unit 40, and starts processing by the print unit 41 (step SG3). If the target control function unit is the communication control unit 25, the print control unit 29 receives the print control data from the communication control unit 25, sends the received print control data to the print control unit 40, and starts the receipt printing process by the print unit 41. If the target control function unit is the print data communication unit 26, the print control unit 29 receives a print coupon control command from the print data communication unit 26, sends the received print coupon control command to the print control unit 40, and starts the coupon printing process by the print unit 41.

Next, the print control unit 29 checks if the process of the print unit 41 (producing a receipt, producing a coupon) has finished (step SG4). For example, if the print control unit 29 received the process result report data described above, it determines if processing by the print unit 41 finished.

Next, the print control unit 29 starts counting time T1 (step SG5). Time T1 is, for example, 1 second.

Next, the print control unit 29 checks if data was received from the target control function unit before time T1 passes (step SG6), or if time T1 passes without receiving data from the target control function unit (step SG7).

If data is received from the target control function unit before time T1 passes, e.g. elapses, (step SG6: YES), the print control unit 29 returns to step SG3, sends the received data to the print control unit 40, and starts processing by the print unit 41.

If time T1 passes without receiving data from the target control function unit (step SG7: YES), the print control unit 29 cancels prohibition of data transmission to the print control unit 29 by the non-target control function unit (step SG8).

In this example in step SG8, the print control unit 29 sends the transmission block cancel notice indicating that prohibition of data transmission to the print control unit 29 is cancelled to the non-target control function unit. When the control function unit receives this notice, it can send data to the print control unit 29. The print control unit 29 then returns to step SG1.

As described above, the print control unit 29 switches between controlling the print unit 41 based on print control data, and controlling the print unit 41 based on a print coupon control command (coupon printing control data).

Thus comprised, even when transmission of print control data from the POS terminal 8 to the printer 12, and transmission of coupon printing control data from the control server 10 to the printer 12, occur simultaneously, the print control unit 29 finishes processing based on data received from one before processing data received from the other. Errors resulting from data being sent simultaneously to the print control unit 29, such as the data received by the printer 12 becoming mixed, are prevented.

Device operation when a device (a card reader CR or a barcode reader BR in this example) disposed to the printer 12 sends data to the printer 12 is described next.

Figure 11:
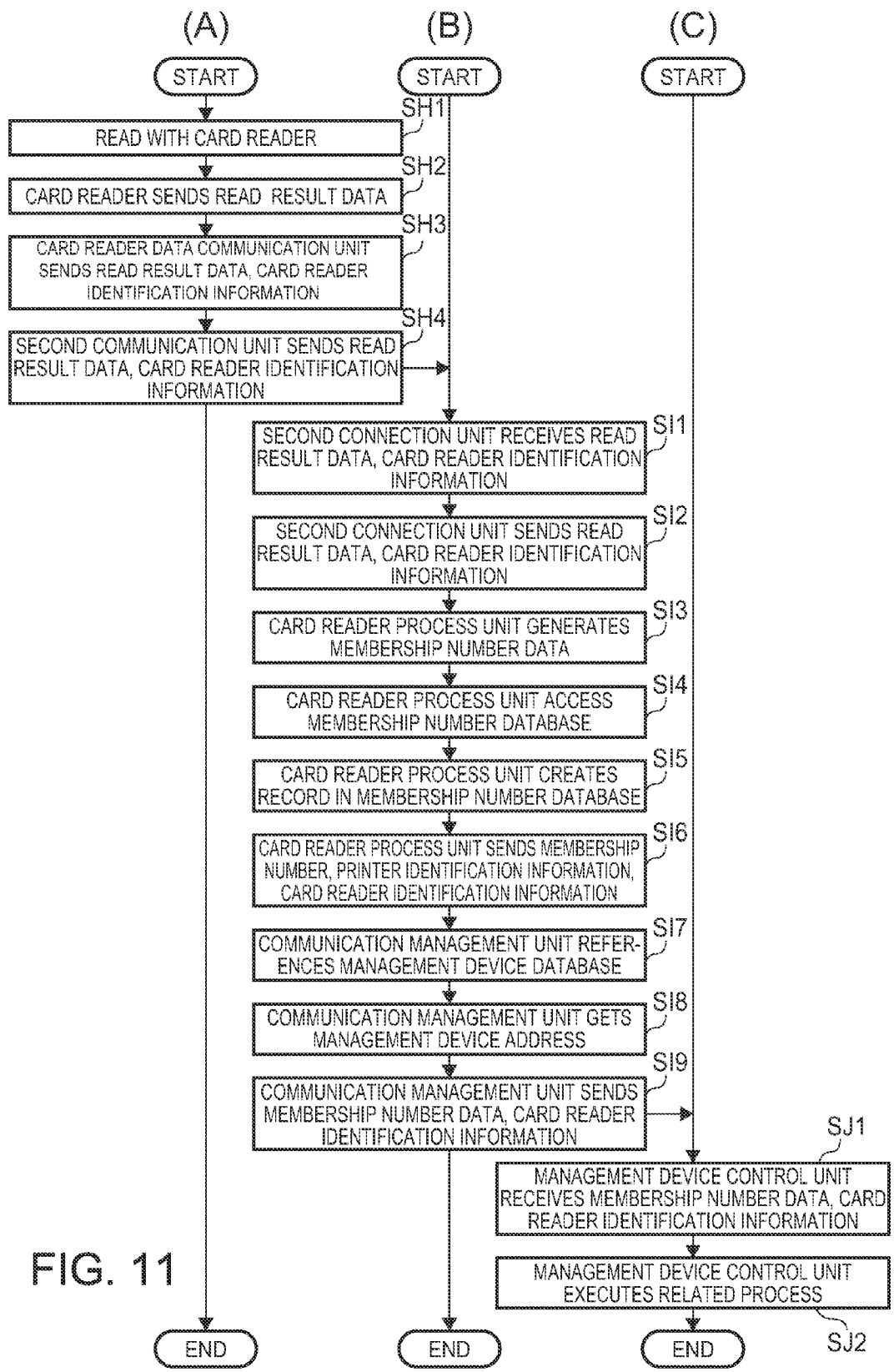
FIG. 11 is a flow chart showing the operation of the printing device and the control server.

FIG. 11 is a flow chart showing the operation of the printer 12, the control server 10, and the management device 14 when a customer membership card is read by the card reader CR. FIG. 11, column (A) shows the operation of the printer 12, column (B) the operation of the control server 10, and column (C) the operation of the management device 14.

As shown in FIG. 11, column (A), when a membership card is read by the card reader CR (step SH1), read result data indicating the result of reading is sent from the card reader CR to the card reader data communication unit 28 (step SH2). This read result data is binary data. Information indicating the membership number of the customer is contained in the read result data.

Asynchronous duplex communication between the card reader data communication unit 28 and the card reader process unit 53 through the second function unit communication path KT2 is also described below.

The card reader data communication unit 28 adds information indicating the current date (referred to below as the read date information) to the received read result data, and sends the read result data and card reader identification information (described below) to the second communication unit 31 (step SH3). The read date information is information identifying when the data was read by the card reader CR.

The operation of step SH3 is described below.

The card reader identification information is data identifying the card reader. The card reader identification information is a device identifier uniquely identifying the card reader CR. The device identifier is identification information assigned to a particular device (in this example, the card reader CR or barcode reader BR), and is different for every device. The device identifier may be, for example, a combination of product ID and vendor ID.

When a card reader CR is connected to the printer 12, the card reader CR reports the card reader identification information to the card reader data communication unit 28 using a specific protocol. The card reader data communication unit 28 then stores data representing the received card reader identification information in a specific storage area.

In step SH3, the card reader data communication unit 28 sends the read result data and the card reader identification information stored in the specific storage area to the second communication unit 31.

The second communication unit 31 sends the received read result data and card reader identification information data by the second WebSocket connection CT2 to the control server 10 (step SH4).

The second connection unit 55 receives the read result data and the card reader identification information by the second WebSocket connection CT2 (step SI1).

The second connection unit 55 sends the received read result data and card reader identification information to the card reader process unit 53 (step SI2).

The card reader process unit 53 stores the received read result data in a work area created in RAM. Next, the card reader process unit 53 extracts the string indicating the membership number of the customer contained in the read result data, and generates membership number data (device data), which is a text file containing the extracted text string (character data) representing the extracted membership number (step SI3).

Next, the card reader process unit 53 accesses the print control data database 57b stored in the control server storage unit 57 (step SI4).

FIG. 9, part (B) illustrates the data structure of a record in the membership number database 57d.

As shown in FIG. 9, part (B), one record in the membership number database 57d relationally stores the printer identification information, record creation date, membership number data, read result data, read date, and device identification information data. Note that the record creation date is information identifying when the record was created.

Next, the card reader process unit 53 creates one record in the membership number database 57d, and stores the printer identification information for the printer 12 that sent the print control data in the appropriate field of the record. The card reader process unit 53 also stores the record creation date indicating when the record was created in the appropriate field of the record. The card reader process unit 53 also stores membership number data generated from the received read result data in the appropriate field of the record. The card reader process unit 53 also stores membership number data generated from the received read result data in the appropriate field of the record. The card reader process unit 53 also stores the read date data indicating the read date information contained in the read result data in the appropriate field of the record. The card reader process unit 53 also stores the device identification information data (the card reader identification information in this example) in the appropriate field of the record (step SI5).

Next, the card reader process unit 53 sends the membership number data and the printer identification information of the printer 12 that sent the read result data, to the communication management unit 50 (step SI6).

The communication management unit 50 then references the management device database 57c stored by the control server storage unit 57 (step SI7).

Next, the communication management unit 50 acquires the address of the management device 14 related to the identification information from the management device database 57c using the printer identification information contained in the data received from the card reader process unit 53 as the search key (step SI8).

Next, the communication management unit 50 controls the control server communication interface 58 to send the membership number data and card reader identification information to the management device 14 at the address acquired in step SI8 (step SI9).

As shown in FIG. 11, column (C), the management device control unit 70 then controls the management device communication interface 71 and receives the membership number data and card reader identification information (step SJ1).

Next, the management device control unit 70 executes the appropriate process based on the membership number data and card reader identification information (step SJ2).

For example, in step SJ2, the management device control unit 70 stores the membership number identified by the membership number data, and the device identification information indicated by the card reader identification information together with current date/time information. The stored information can be used as a customer shopping history, and used to analyze the purchasing patterns of customers that come to a store. Based on the stored device identification information, the membership number can also be known to result from reading by the card reader CR.

The management device control unit 70 can also command producing a coupon according to the membership number indicated by the membership number data.

Mail containing store related information or containing coupons can also be sent to the customer of the membership number indicated by the membership number data, and if a point system exists, points can be rewarded to the customer.

Note that the card reader process unit 53 may be configured to send the store information described above together with the membership number data and card reader identification information. In this case, the management device control unit 70 can manage a shopping history by individual store, and can analyze customer shopping patterns by individual store.

The operation of devices after a card reader CR reads a card is described above, but data based on the read result may also be sent by the printer 12 to the control server 10 and processed appropriately by the control server 10 when the barcode reader BR reads a barcode. The data may also be sent from the control server 10 to the management device 14, and processed appropriately by the management device 14.

In this embodiment of the invention, the printer 12 can send data sent from a device to the control server 10 by an added function provided by the interface board 20, that is, by the card reader process unit 53 and barcode reader data communication unit 27. Because the printer 12 transmits the print control data using the first WebSocket connection CT1, data can be sent without a process of establishing a new connection when data is received from a device.

Furthermore, in this embodiment, the control server 10 stores read result data received from the printer 12 and membership number data based on the read result data. This data can be used to analyze customer shopping patterns by store or printer 12. The control server 10 stores information resulting from connection of a device to a printer 12.

Furthermore, in this embodiment, membership number data is sent from the control server 10 to the management device 14. Based on the membership number data, management device 14 executes an appropriately process. In other words, the management device 14 according to this embodiment can execute appropriate processes using connection of a device to a printer 12.

As described above, the POS control system 1 according to this embodiment includes a POS terminal 8, a printer 12, and a control server 10 (control device).

The POS terminal 8 has a POS terminal control unit 45 (control unit) that generates print control data based on a transaction process, and a terminal communication interface 46 (communication unit) that transmits the print control data.

The printer 12 has a print unit 41 that prints; a print control unit 29 that controls the print unit 41 based on the print control data; a USB communication connection unit 34 (communication connection unit) that connects to the POS terminal 8 and receives print control data; and a print data communication unit 26 that transmits print control data through a first WebSocket connection CT1 by asynchronous duplex communication.

The control server 10 has a first connection unit 54 (reception unit) that receives print control data sent by the print data communication unit 26 of the printer 12 through a first Web-Socket connection CT1; and a print data process unit 51 that executes a process based on the received print control data.

Thus comprised, the print control data sent from the POS terminal 8 to the printer 12 is sent to the control server 10 by a function of the print data communication unit 26. As a result, the control server 10 can execute an appropriate process based on the received print control data. The printer 12 also sends print control data to the control server 10 by asynchronous duplex communication. Therefore, when print control data is received from the POS terminal 8, the printer 12 can send the print control data to the control server 10 without establishing a new communication path and without synchronizing communication with the control server 10. As a result, in a POS control system 1 in which print control data is sent from the POS terminal 8 to the printer 12, a control server 10 connected to the printer 12 through a network can execute processes based on print control data, and the system can be made compatible with configurations in which a printer 12 and a control server 10 communicate through a network GN.

Furthermore, in this embodiment, the print control data is binary data, and the print data process unit 51 of the control server 10 extracts strings contained in the print control data, and generates extracted string data, which is text data containing the extracted strings.

Thus comprised, the control server 10 can convert the received print control data to data with great utility.

The control server 10 also has a control server storage unit 57 that relationally stores print control data and extracted string data.

By thus storing print control data and extracted string data based on the print control data, the control server 10 can later analyze the data and extract information therefrom. Furthermore, by storing print control data, information that is lost when generating the extracted string data based on the print control data can also be stored. Furthermore, because the print control data is stored, the print control data can also be used for reprinting.

The printer 12 also has a communication control unit 25 that sends the print control data the POS terminal 8 sent to the print control unit 29 and the print data communication unit 26.

Thus comprised, print control data can be sent by a function of the communication control unit 25 to the print control unit 29 and printed by the print unit 41, and print control data can be sent to the print data communication unit 26 and the print control data then sent to the control server 10.

After printing by the print unit 41, the print control unit 29 of the printer 12 sends the process result report data (report data) indicating the result of printing to the communication control unit 25, and after receiving the process result report data, the communication control unit 25 sends print control data to the print data communication unit 26.

Thus comprised, after finishing printing by the print unit 41, the printer 12 can send print control data related to the printing process to the control server 10.

As described above, the POS control system 1 according to an embodiment of the invention includes a POS terminal 8, a printer 12, a control server 10 (control device), and a management device 14.

The POS terminal 8 has a POS terminal control unit 45 (control unit) that generates print control data based on a transaction process, and a terminal communication interface 46 (communication unit) that transmits the print control data.

The printer 12 has a print unit 41 that prints; a print control unit 29 that controls the print unit 41 based on the print control data; a USB communication connection unit 34 that connects to the POS terminal 8 and receives print control data; and a print data communication unit 26 that establishes a first WebSocket connection CT1 and transmits print control data by asynchronous duplex communication.

The control server 10 has a print data process unit 51 that receives print control data sent by the print data communication unit 26 of the printer 12 through a first WebSocket connection CT1 and generates extracted string data (data) based on the print control data; and a communication management unit 50 that transmits the extracted string data generated by the print data process unit 51.

The management device 14 has a management device control unit 70 (device control unit) that processes the extracted string data sent by the communication management unit 50 of the control server 10, and sends the process result to the control server 10.

Thus comprised, the control server 10 and management device 14 can execute appropriate processes based on print control data the POS terminal 8 sent to the printer 12. The printer 12 also sends print control data to the control server 10 by asynchronous duplex communication. Therefore, when print control data is received from the POS terminal 8, the printer 12 can send the print control data to the control server 10 without first sending a request to the control server 10. More specifically, in a control system in which print control data is sent from the POS terminal 8 to the printer 12, and the printer 12 and management device 14 communicate with a control server 10 through a network GN, the printer 12 and management device 14 can executes processes based on the print control data, and a POS control system 1 can be made compatible with configurations in which a printer 12 and a management device 14 communicate with a control server 10 through a network GN.

Furthermore, in this embodiment, the print control data is binary data, and extracted string data generated by the print data process unit 51 of the control server 10 is text data containing strings extracted from the print control data.

The text data is data that can be used for data analysis using string searches, and the utility of the data is high. This aspect of the invention enables the control server 10 to convert the received print control data to data with great utility.

Furthermore, in this embodiment, the management device control unit 70 of the management device 14 generates and sends to the control server 10 coupon printing control data (second print control data) that controls the printer 12 based on the received extracted string data. The print data process unit 51 of the control server 10 sends the received coupon printing control data by the first WebSocket connection CT1 to the printer 12.

Thus comprised, the printer 12 can be controlled to print based on the result of a process executed by the management device 14.

Furthermore, in this embodiment, the print control data is receipt data for printing a receipt, the extracted string data is data containing strings printed on the receipt, and the coupon printing control data is data that is generated for printing a coupon when it is determined to issue a coupon based on analyzing the extracted string data that was received.

Thus comprised, the printer 12 can be controlled by a function of the management device 14 to print a coupon corresponding to the receipt.

Furthermore, in this embodiment, the control server 10 has a control server storage unit 57 that stores print control data and extracted string data.

By storing print control data and extracted string data, the control server 10 in this example can later analyze the data and acquire information therefrom. Furthermore, by storing print control data, information that is lost when generating the extracted string data based on the print control data can also be stored. Furthermore, because the print control data is stored, the print control data can also be used for reprinting.

The invention is described above with reference to a preferred embodiment thereof, but the invention is not limited thereto and can be modified and adapted in many ways without departing from the scope of the accompanying claims.

A card reader CR and a barcode reader BR are used as examples of devices in the foregoing embodiment, but the devices that connect to the printer 12 are not limited thereto. Other examples of such devices include cash registers, display panels, and touch panels.

The process executed by the management device 14 based on the extracted string data is also not limited to producing coupons. For example, a process that stores all or part of the extracted string data may be executed. Another exemplary process is a process that references a customer master database based on the extracted string data, retrieves the mail address of a customer, and sends mail to the customer.

The printer 12 is disposed to a store system 11 used in a store in the foregoing embodiment. However, the printer 12 is not necessarily used in a store system 11, and may obviously be used in other types of systems.

The function blocks shown in FIG. 3 can be embodied by hardware and software, and do not suggest a specific hardware configuration. The function of the printer 12 may also be handled by a separate device externally connected thereto. The printer 12 may also execute processes by running a programs stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A POS (Point Of Sale) control system comprising:
a POS terminal including a control unit that generates print control data based on a commercial transaction process, and a communication unit that transmits the print control data;
a printer including a print unit that prints, a print control unit that controls the print unit based on the print control data, a communication connection unit that connects to the POS terminal and receives the print control data, and a print data communication unit that transmits the print control data by asynchronous duplex communication; and
a control device including a reception unit that establishes a communication path with the print data communication unit and receives the print control data sent by the print data communication unit, and a print data process unit that executes a process based on the received print control data;
wherein:
the printer has a communication control unit that sends the print control data sent by the POS terminal to the print control unit and to the print data communication unit;
the print control unit of the printer sends report data indicating completion-of-printing to the communication control unit after printing by the print unit is complete; and
the communication control unit of the printer sends the print control data to the print data communication unit after receiving the report data.

2. The POS control system described in claim 1, wherein:
the print control data is command data; and
the print data process unit of the control device extracts a string contained in the print control data, and generates text data containing the extracted string.

3. The POS control system described in claim 2, wherein:
the control device has a storage unit that relationally stores the print control data and the text data.

4. The POS control system described in claim 1, wherein:
said asynchronous duplex communication is WebSocket communication.

5. A control method of a POS control system, comprising:
a POS terminal executing a commercial transaction process, generating print control data based on the commercial transaction process, and transmitting the print control data to a printer; and
the printer receiving the print control data, using a print control unit to print based on the received print control data, and using a print data communication unit to transmit the print control data to a remote control device;
wherein:
the print control unit sends report data indicating completion-of-printing after printing is complete; and
the print data communication unit receives the print control data for on after the print control unit sends the report data.

6. A printer comprising:
a communication connection unit that connects to an external device and receives print control data sent by the external device;
a print control unit that controls a print unit to print based on the print control data; and
a print data communication unit that transmits the print control data by asynchronous duplex communication to a remote device other than said external device;
wherein:
the printer has a communication control unit that sends the print control data sent by the external device to the print control unit and to the print data communication unit;
the print control unit of the printer sends report data indicating completion-of-printing to the communication control unit after printing by the print unit is complete; and
the communication control unit of the printer sends the print control data to the print data communication unit after receiving the report data.

* * * * *